United States Patent [19]

Lipson

[11] Patent Number: 5,435,554
[45] Date of Patent: Jul. 25, 1995

[54] BASEBALL SIMULATION SYSTEM

[75] Inventor: Peter Lipson, Milpitas, Calif.

[73] Assignee: Atari Games Corporation, Milpitas, Calif.

[21] Appl. No.: 29,321

[22] Filed: Mar. 8, 1993

[51] Int. Cl.$^6$ ............................................... A63F 9/22
[52] U.S. Cl. ..................................... 273/88; 273/434; 273/93 R
[58] Field of Search .............. 273/88, 93 C, 94, 85 G, 273/434, 437, 438, DIG. 28, 237

[56] References Cited

U.S. PATENT DOCUMENTS

| Re. 33,662 | 8/1991 | Blair et al. | 364/410 |
|---|---|---|---|
| 3,860,239 | 1/1975 | Feuer et al. | 273/88 |
| 4,357,014 | 11/1982 | Baer et al. | 273/85 G |
| 4,395,760 | 7/1983 | Soski et al. | 273/85 G |
| 4,552,360 | 11/1985 | Bromley et al. | 273/85 G |
| 4,580,782 | 4/1986 | Ochi | 273/86 R |
| 4,672,541 | 6/1987 | Bromley et al. | 364/410 |
| 5,026,058 | 6/1991 | Bromley | 273/93 C |
| 5,067,079 | 11/1991 | Smith, III et al. | 364/410 |
| 5,190,285 | 3/1993 | Levy et al. | 273/85 G |

OTHER PUBLICATIONS

TurboGrafx 16 "World Class Baseball" ©Hudson Soft 1989, from handbook of Nov. 1990.
Advertisement by Sega Enterprises, Inc., Clutch Hitter, 1 page.

Primary Examiner—Jessica J. Harrison
Attorney, Agent, or Firm—Knobbe, Martens, Olson & Bear

[57] ABSTRACT

A system and method for simulating a baseball game. The present invention includes means for controlling the direction of a hit through timing and joystick control. The pitch of the ball is controlled in vertical and horizontal directions to provide a three-dimensional control effect. The quality and style of the pitch is determined through grip selection. Feedback is provided on grip and power in conjunction with the targeted pitch area. Base running strategy is selected before a hit, e.g., safety squeeze, suicide squeeze and hold.

51 Claims, 16 Drawing Sheets

Microfiche Appendix Included
(1 Microfiche, 25 Pages)

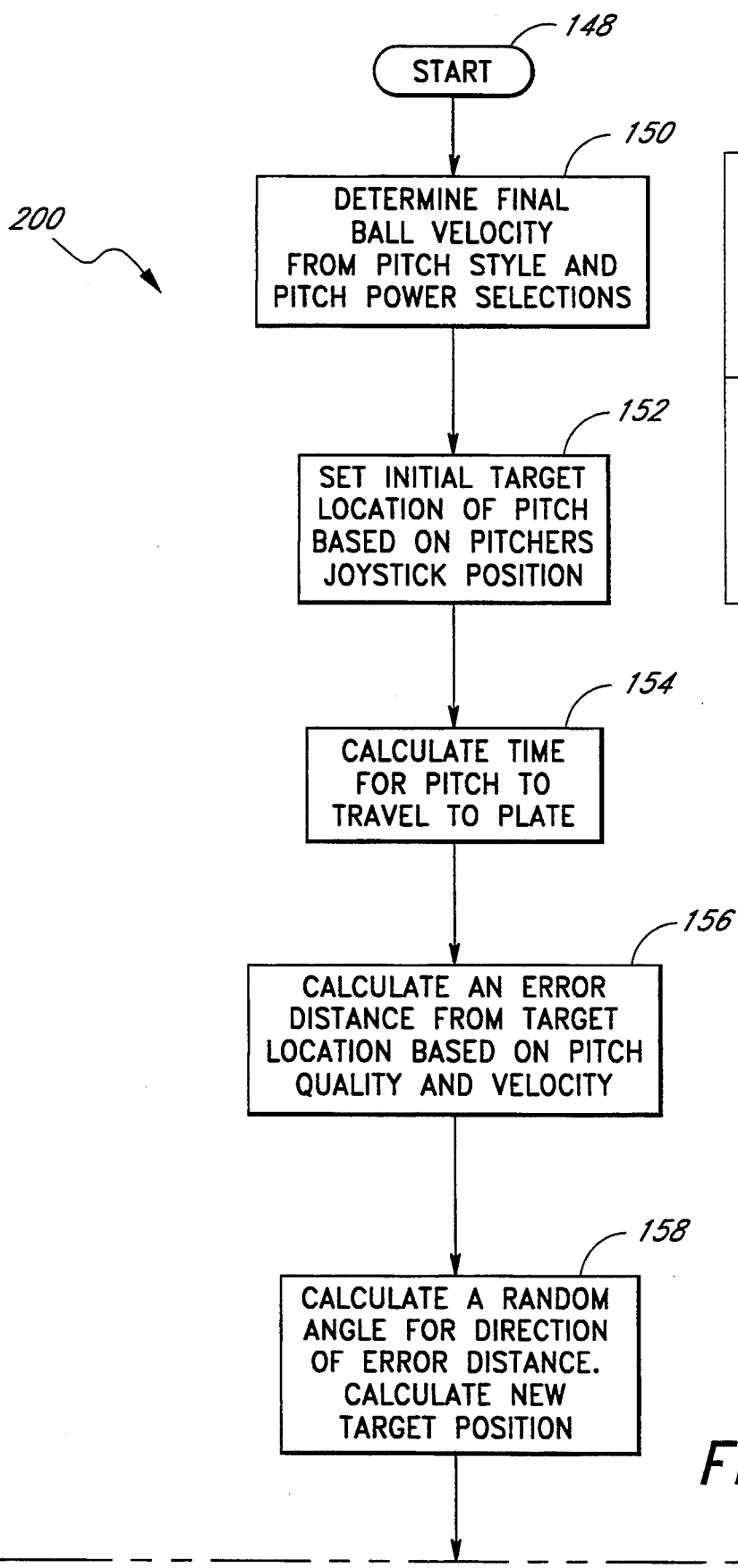

BASEBALL SIMULATION SYSTEM

MICROFICHE APPENDIX

A microfiche appendix containing computer source code is attached. The microfiche appendix comprises one (1) sheet of microfiche having 25 frames, including one title frame.

The microfiche appendix contains material which is subject to copyright protection. The copyright owner has no objection to the reproduction of such material, as it appears in the files of the Patent and Trademark Office, but otherwise reserves all copyright rights whatsoever.

BACKGROUND OF THE INVENTION

1. Field of the Invention

The present invention relates to computer controlled video simulation systems, and generally to computerized simulation systems for sports. More specifically, the present invention relates to a computerized video system that simulates a baseball game.

2. Description of the Related Technology

Baseball, like other sports, has been realized in electronics implementations so that anyone can enjoy the game without ever touching a bat or ball. Many electronic devices have employed basic baseball simulations in an attempt to accurately represent the playing of a real baseball game. As a consequence, numerous such devices have emerged which vary in their technique for simulating pitching and hitting of the baseball. It is desirable for simulation systems to allow a user to mimic real world factors to more accurately determine how the simulation will be enacted. Unfortunately, present systems for simulating a baseball game either do not incorporate many of the factors that determine the outcome of a baseball game and which are normally dependent on a real player's skill, or these factors are determined merely through statistical chance.

To obtain a more realistic baseball simulation game, it is desirable to allow players to affect as many real-world factors as feasible when operating the game. Many electronic baseball games have attempted to emulate some of the real-world factors that determine how a ball is pitched or whether it will be hit. For example, in U.S. Pat. No. 3,860,239 to Feuer, et al., an electronic baseball game allows a game player to score a successful hit only when a swing is registered within a predetermined time interval. However, if a swing is registered within the time interval, the determination of whether the ball will result in a hit or an out is essentially a random function and not dependent on any skill which may be attributed to the game player. Specifically, the type of play that results from the hit ball is determined only by exactly where in the time interval a swing button was pressed. Although this game attempts to simulate realistic batting, it is apparent that the game lacks many factors present in a real baseball game.

Other generally applicable advances in game technology have allowed a somewhat greater degree of control in video games. For instance, U.S. Pat. No. 4,552,360 to Bromley, et al. discloses a hand-held game control device that is used with a video baseball game to allow a player to select from various types of pitches and then select the direction a pitched ball will tend to move. Also, U.S. Pat. No. 5,026,058 issued to Bromley discloses an electronic baseball game which utilizes a card reader to input statistical data of the batter, pitcher and runners. This statistical data more accurately represents the natural variations in playing ability that would occur between players on a given baseball team. However, the user of the video game must rely on the predetermined statistical data and cannot control certain game functions based on the user's own inherent statistically-defined abilities.

Other features in the Bromley device do allow some control of the pitching and batting functions. In particular, the game users have the ability to select various types of pitches and the ability to steal a base after the pitcher starts his windup. A hit is allowed only when the bat and ball are simultaneously within the same specified two-dimensional position. The direction and end result of the hit ball is determined through a matrix table as a function of the location on the bat that struck the ball and on the statistical factors of the players. This system, while allowing for timing and ball position to be factors in determining where a ball will be hit, only monitors the horizontal position of the ball and, moreover, guarantees that a ball will be hit if the bat and ball are in the same position at the same time. Unlike Bromley, it would be desirable for a system to determine the likelihood of a hit ball based on timing and other real-world factors.

Other devices have attempted to approximate the realism of a baseball game by enabling a user of a game to have full body physical interaction with the game. For example, such a video-game device that is adaptable to baseball type games is shown in U.S. Pat. No. Re. 33,662 issued to Blair, et al. In Blair, a method is disclosed whereby the player of a baseball game would actually swing a bat in front of a video monitor to effectuate a three-dimensional real interaction with a pitched baseball displayed on a screen. Although such a system incorporates three-dimensional use of bat and ball position, it does not allow the user to affect the path of the pitched ball in three-dimensions, nor does it determine the probability of a hit based on the timing of a batter's swing with the pitched ball.

Some baseball simulation games have included hand-held devices which increase the level of realism through enhanced audio simulation. A hand-held baseball game unit of this type is disclosed in U.S. Pat. No. 5,067,079 issued to Smith III, et al. The device in Smith incorporates a realistic audio system to maintain a user's interest. The path of a pitched ball, however, is displayed on a two-dimensional array of 9 Light Emitting Diodes (LEDs) that flash sequentially. A hit is determined by either recording a swing between two successive flashes or by predicting the area of the strike zone in which the pitch will cross. In contrast to Smith, it is desired to create a realistic three-dimensional effect from a two-dimensional screen and determine the probability of a hit based on timing and other factors collectively, where such factors may include the strike-zone position in which the pitched ball, as well as the swung bat, have passed.

Still another electronic baseball game is disclosed in U.S. Pat. No. 4,395,760 issued to Soski, et al. Like the Smith device, the path of the pitched ball in Soski is traced by a two-dimensional display of LEDs. Also, the path of the ball in Soski is determined by a random selection of pitch types by the computer. In Soski, a hit is determined solely by the timing of the batter's swing and random statistical factors. An improved baseball system would utilize multiple batter and pitcher inputs that represent real world factors to determine the probability of a hit ball.

In addition to the many hand-held electronic baseball games available, there are also similar upright video game units currently used in arcades. For example, Sega Enterprises manufactures a baseball video game entitled "Clutch Hitter". In Clutch Hitter, a player is allowed to select a style of pitch (i.e. curve, fastball, sinker) by manipulating a joystick before the pitch is thrown. Once the pitch is thrown, the same player determines the area of the strike zone the pitch will pass through by again manipulating the joystick. While Clutch Hitter does allow some degree of control over the pitching function, enhanced user controllability of pitching functions is desired in a baseball simulation system.

Another arcade-version baseball game that is commonly seen is called "Tournament". In Tournament, a player who is pitching is able to control the power of a pitch through the use of an on-screen gauge. To control the direction of a batted ball, a player of Tournament is able to move the batter closer or further away from the strike zone while in the batter's box. This movement of the batter employed in Tournament is attempting to simulate the batter's adjustments when hitting a ball to left or right field. Although the control of the batter enjoyed by a player in Tournament is an improvement over earlier devices, it does not allow the player to affect the more significant factors that control the direction of a hit baseball.

Consequently, as can be seen from an evaluation of the prior art and notwithstanding the attempts made to increase the realism of simulated baseball games, there is much room and need for improvement in the art of electronic baseball simulation. This need for improvement is fueled by the user's desire to have increased control over the variables associated with a baseball game that determine the results of the game. Such control will allow the simulation to better resemble an actual baseball game and give the user an increased understanding for the subtle aspects of playing baseball.

SUMMARY OF THE INVENTION

The drawbacks and realistic deficiencies that exist in the prior art as discussed above have been overcome by the present invention through the use of enhanced simulation and user control over the batting and pitching functions.

In accordance with one aspect of the present invention, a computer assisted baseball game contains a game processor, a video display for depicting the game events, and a player input panel having various user input devices. The user input devices allow a player or players to control the game operation as will be shown on the display device. Control software within the game system incorporates the user inputs into a predetermined game routine which allows the player to obtain realistic interaction with the game display. More particularly, the pitching, batting and coaching functions of the baseball game are primarily determined through selection of user inputs.

The present invention allows multiple real-world factors to be controlled by the user to create a game simulation where the game results are more dependent on user operation and less dependent on computer-generated statistics. By allowing a user's inputs, to affect the real-world factors present in baseball, the user becomes a more active and realistic participant in the simulation.

One of the most important factors that will determine not only the trajectory of a hit baseball, but whether the ball will be hit at all, is the timing of the swing relative to the position of the pitched baseball. The present invention employs a unique method whereby a batter's timing during a swing, among other things, will affect the decision of whether a ball is hit well, hit poorly, or not hit at all.

Other aspects of a real baseball game which are used in the present invention to enhance the simulation include the speed of the pitch, the portion of the strike zone that the pitch is thrown to, the section of the strike zone through which the batter actually swung, the power of the swing, and the quality of the thrown pitch as determined by the precise grip that the pitcher had while throwing the ball.

Also consistent with real-world baseball strategy, the base runners in the present invention may be given a coaching instruction—say, to steal a base—before a ball is pitched which enables the batter to concentrate on the batting function alone during the pitch. It is these, as well as other, additional factors employed by the present invention that make the simulation approximate a real baseball game more closely than any other system used previously.

These and other objects and features of the present invention will become more fully apparent from the following description and appended claims taken in conjunction with the accompanying drawings.

BRIEF DESCRIPTION OF THE DRAWINGS

FIG. 1b is a top plan view of the user operated inputs of the game unit shown in FIG. 1a;

DETAILED DESCRIPTION OF THE PREFERRED EMBODIMENTS

Reference is now made to the drawings wherein like numerals refer to like parts throughout.

Figure 1A:
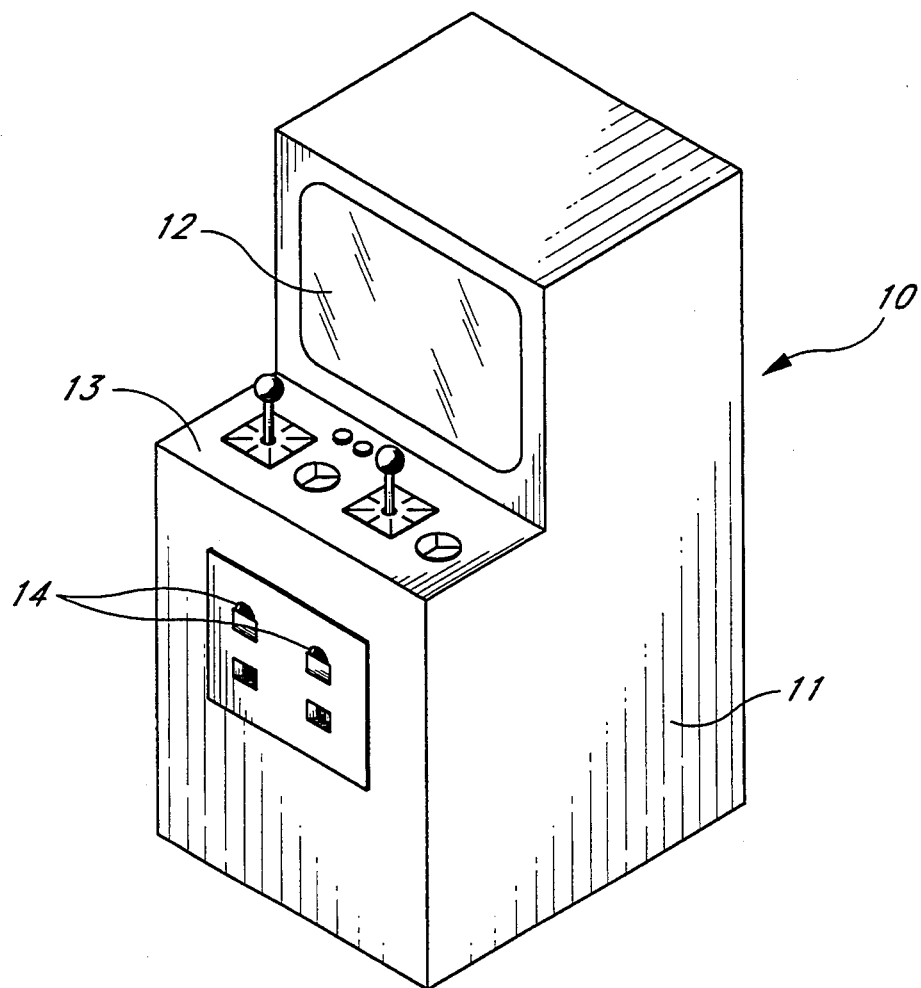
FIG. 1a is a perspective view of a preferred video game unit of the present invention.

FIG. 1a illustrates an overall view of a video game system in accordance with the present invention. The video game unit 10 is shown having a video display 12, a user input panel 13, two coin inputs 14 and a housing 11 which contains the computer software for operating the game outlined in FIG. 2.

Figure 1B:
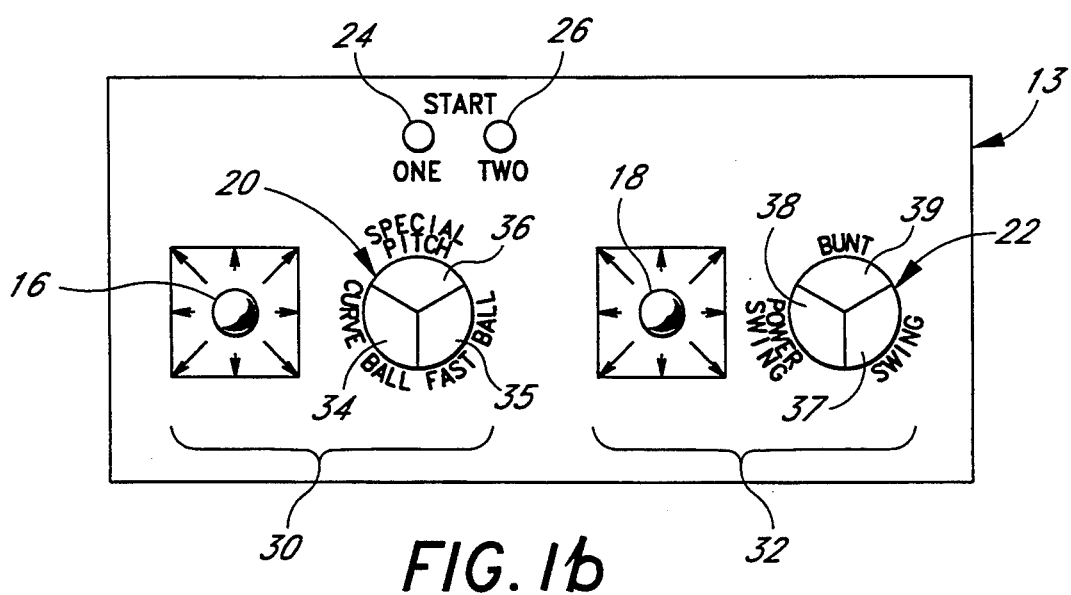

The user input panel 13 is more clearly shown in FIG. 1b as two sets of control devices 30, 32. Each set 30, 32 contains, respectively, an 8-directional control joystick 16, 18 and a 3-button input panel 20, 22. Also included on the input panel are the start select buttons 24, 26 for either one player or two players.

Buttons on the 3-button control panels 20, 22 determine the various types of pitches and swings used by the players. Control set 30 is used for pitching control and accordingly, the 3-button control unit 20 determines what style of pitch is thrown. Specifically, unit 20 is composed of three separate buttons 34, 35, 36 which correspond to a curve ball, fast ball or special pitch, respectively. The style of pitch attributed to the "special pitch" button will depend on the particular pitcher selected by the player at the beginning of the game. For example, upon starting play, a player may select a pitcher who is highly skilled at throwing "sinker" pitches, "knuckle ball" pitches, etc. It is also conceivable that a pitcher may have the "curve" ball pitch or the "fastball" pitch as their specialty, thus effectively reducing the number of types of pitches selectable by the user.

The batter's set of control devices 32 contains the joystick 18 and 3-button panel 22. The joystick 18 will be used to determine the direction of a batted ball and the control panel 22 will be used to select a particular type of swing. Specifically, panel 22 is comprised of three buttons 37, 38 and 39 which represent a normal swing, a power swing and a bunt attempt, respectively.

Figure 2:
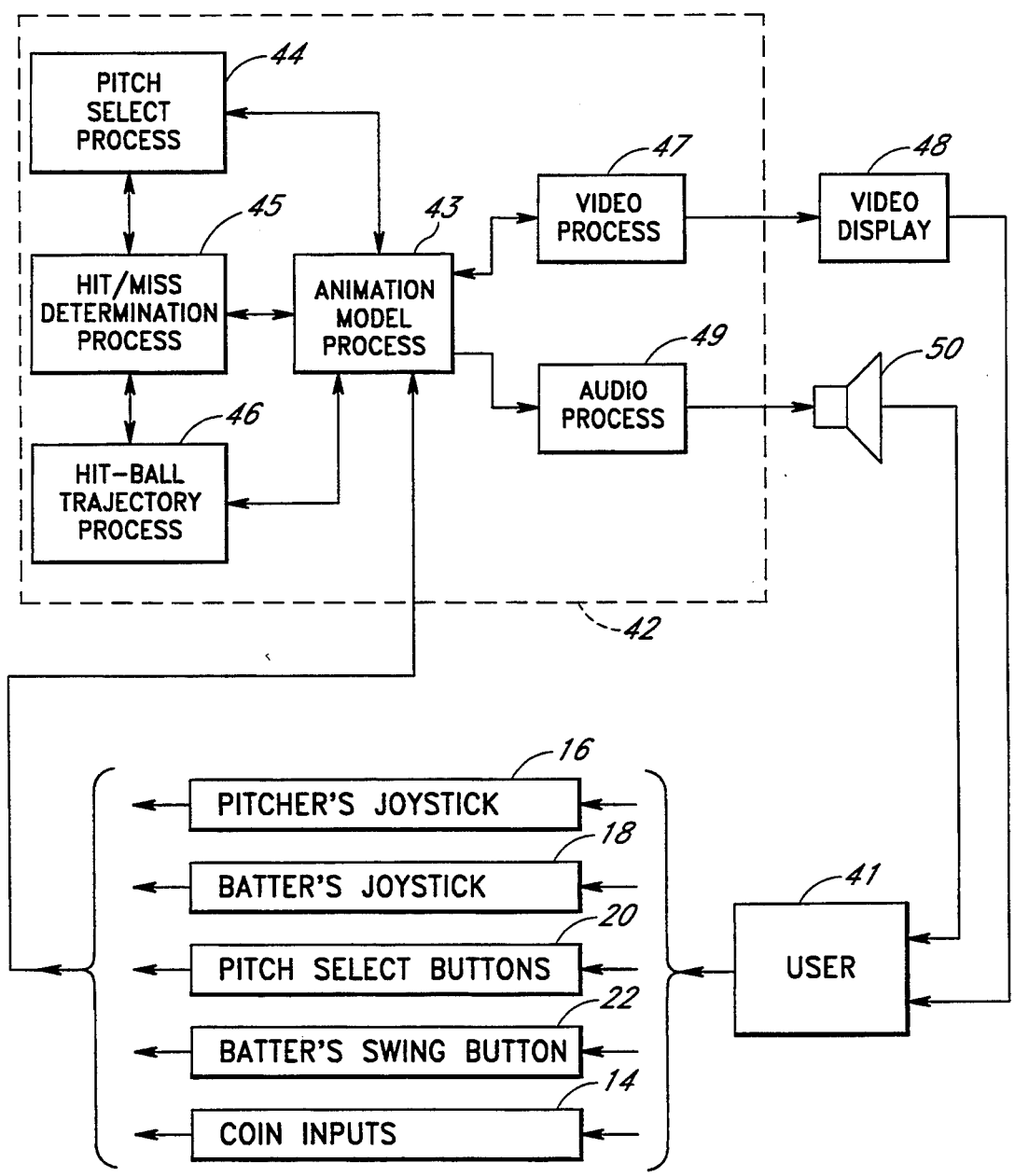
FIG. 2 is a block diagram of the game unit of FIG. 1a and its relationship with a user.

The user inputs 16–22 are electromechanical devices and are depicted in FIG. 2 along with the coin inputs 14. All of the inputs 14–22 are operated by a user 41 which enable the inputs to feed electrical signals to a computer 42. The computer 42 contains six processes, implemented as combinations of computer hardware and software, as shown in FIG. 2. The processes include an animation model process 43 which receives electrical signals corresponding to movements of the user inputs 14–22. In the presently preferred embodiment, the animation model process 43 includes a general purpose microprocessor such as a Motorola 68000 or another member of the Motorola 680x0 microprocessor family. The function of the animation model process is to receive the user input data from the user inputs 14–22 and maintain the appropriate screen display that provides user feedback. These screen displays will include the baseball playing field representation and associated actions of the various players on the field that occur during a typical baseball game.

In maintaining the appropriate baseball video display, the animation process 43 communicates with a pitch select process 44 and a hit/miss determination process 45. The pitch select process 44 includes a series of instructions stored in a memory unit for inputting user data via the animation process 43 and calculating the appropriate pitch trajectory based on the user inputs. The hit/miss determination process 45 communicates with the pitch select process 44 and the animation model process 43, to gather data about the particular pitch thrown and about the batter's swing. With this data, a hit/miss determination is made and the process 45 communicates with either the hit-ball trajectory process 46 if a hit was made, or with the animation process 43 if the swing resulted in a miss. In either event, communication is eventually established with the animation process 43 so that control of the appropriate video animation and audio simulation can be maintained.

The animation model process 43 continually provides an updated display state to the video process 47 which preferably will consist of three functional parts; one, a sprite or motion object circuit; two, a scrolling playfield, and three, a static overlay playfield. The ballpark is generated by the scrolling playfield circuitry, the players are generated by the motion object circuitry, and the gauges are generated by the overlay playfield circuitry. In the preferred arcade game embodiment, the playfields and sprites are implemented in ASIC chips. One preferred video display 48, like model no. 25K7171 available from Wells-Gardner of Chicago, Ill., is a multi-synchronous display that can be configured to display 512×288 pixels.

The updated state of the baseball animation model process 43 is also made available to an audio process 49. The audio process 49 generates appropriate sound signals for sounds such as crowd noise, bat and ball contact noise, ball and glove contact noise, and the like. These sound signals are transduced by a speaker 50 thus providing audio feedback to the user 41.

Computer source code of relevant portions of the animation model process 43, the pitch select process 44, the hit-ball trajectory process 46, and the hit/miss determination process 45 are attached herewith in the accompanying Microfiche Appendix.

Figure 3A:
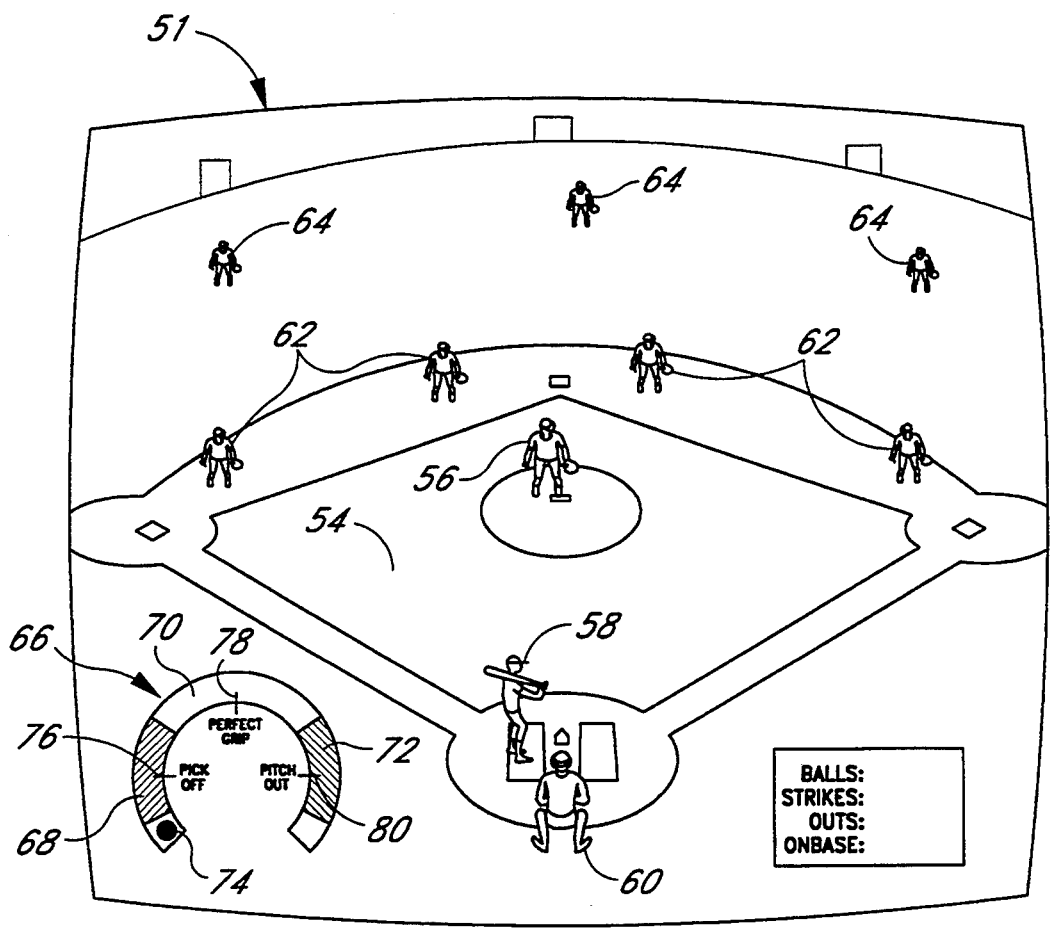
FIGS. 3a,b are representative screen displays showing the game playing field and the gauges used for pitching selection.
Figure 3B:
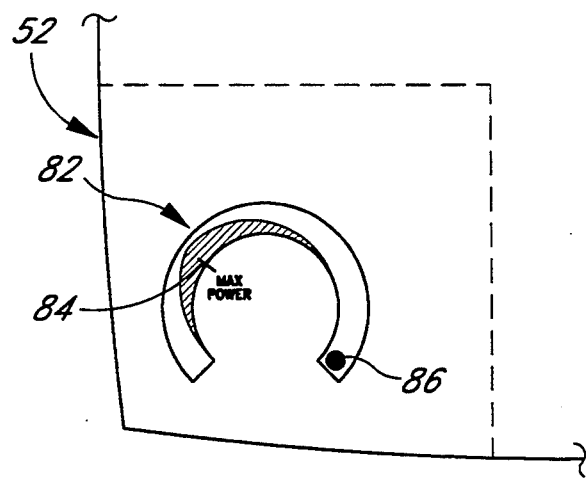

FIGS. 3a and 3b are representations of typical screen displays 51, 52 encountered when playing a game in accordance with the present invention (FIG. 3b is a partial screen display). The display of FIG. 3a contains images of a baseball playing field 54 and associated players as seen from the perspective of a spectator just behind home plate. As shown in FIG. 3a, a pitcher 56 is placed atop the pitcher's mound at the center of the screen and a batter 58 is positioned within the batters box in preparation for a pitch. Other players such as the catcher 60, basemen 62 and fielders 64 are also displayed on the field. The positioning of the players and the perspective viewpoint of the image shown in FIG. 3a are merely representative. The actual images displayed will vary greatly according to the particular stage of the game.

Also shown in FIG. 3a, and unique to the present invention, is the display of the visual feedback gauge 66 depicted in the lower left-hand corner of the screen. The feedback gauge 66 allows the user to select not only the type of pitch but the quality of the pitch as well. FIG. 3a shows the gauge as having a horseshoe shape and three distinct regions 68, 70 and 72. Although gauge 66 of the present invention is shown as a horseshoe, any gauge performing the function described herein may be of any shape or form and may be placed anywhere on, or even off, the video screen. In accordance with the present invention, gauge regions 68, 70, and 72 correspond to pitch types that include a "pick off", "pitch out", or one of the various styles of pitches thrown towards home plate.

To initiate a pitch, a player, or user, who is controlling the pitcher selects one of the three pitch styles as represented on the button control panel 20. This selection by a player will commence an indicator 74 of gauge 66 to begin traveling in a clockwise direction along gauge 66. The player who initiated the movement of the indicator can stop the indicator at any point along the gauge by depressing any of the three buttons 34, 36 or 38 of the button panel 20 (FIG. 1b). Hence, the indicator 74 will continue to pass through the regions 68, 70, 72 sequentially until the player depresses a button. If no button has been depressed and the indicator has reached the end of the third region 72, then the indicator 74 will reset to the beginning of the first region 68 and continue moving in a clockwise direction.

Each region 68, 70 and 72 of gauge 66 has a preferred target point at which a marker 76, 78, and 80 is placed, respectively. Regions 68, 70, and 72 represent the varying degrees of quality associated with a type of pitch. Markers 76, 78 and 80 are placed within the regions 68, 70 and 72 at the point where pitch quality is at a maximum. Thus, a player will most likely attempt to achieve the highest quality pitch or throw by stopping the indicator 74 atop one of the markers 76, 78 or 80. For example, if a player wants to throw to first base to try and "pick off" the runner who is leading the base, the player will attempt to stop the indicator at marker 76 within region 68. When throwing a pitch to the batter across home plate, the player will attempt to stop the indicator 74 at marker 78 to obtain the "perfect grip" on the ball.

Allowing the player to determine the ball grip or quality of a pitch enables the player to directly affect this aspect of a baseball game. In the prior art, the aspect of pitch quality has never before been controlled by a game player, and if controlled at all, was done so by a computer that generated a random number. In accordance with the present invention, however, the player may purposefully alter the quality of the pitch or may, more realistically, attempt to obtain a perfect pitch every time. In so doing, the player's attempt to select the perfect pitch will undoubtedly create a small variance of quality levels for successive pitches. This variance of pitch quality may be statistically random, but, any randomness associated with pitch quality selection will be dependent upon the game user and not the computer.

Apart from controlling the quality of a pitch, the player can also control the power or speed of the pitch. FIG. 3b depicts a partial screen display similar to that shown in FIG. 3a with the exception that a different visual feedback gauge 82 is displayed. During normal game play, gauge 82 of FIG. 3b is displayed immediately after a particular type and quality of pitch is selected by the user in conjunction with gauge 66. Gauge 82 is similar in shape to gauge 66 but contains only one region that represents the spectrum of power that can be applied to a pitch. Like gauge 66, gauge 82 also has a marker 84 which indicates the maximum power obtainable for any given pitch. An indicator 86, which is located at the furthest clockwise position of the gauge, begins movement counter-clockwise once the gauge is displayed and without waiting for a button depress. The indicator will continue movement until either any of the buttons 34, 36 or 38 are depressed or until the indicator 86 reaches the furthest counter-clockwise position. The power which is ascribed to the upcoming pitch is thus the power level associated with the position at which the indicator 86 stopped in the gauge 82. It may or may not be desirable to throw a pitch with the maximum power depending on the type and style of pitch, the batter's ability, etc. Although previous games have allowed a pitcher to adjust the power of a pitch, a player of a baseball game in accordance with the present invention is able to adjust the pitch power in order to complement or compensate for the pitch type and quality previously selected.

In summary, a complete pitch selection cycle will consist of three button depresses of the button control unit 20. The first depress selects the style of pitch, causes the quality selector gauge 66 to be drawn on the video display 48 (FIG. 2) and causes the indicator 74 to begin moving. The second depress registers the pitch quality with the computer as a function of the user selected position of indicator 74. The second depress also draws the power gauge 82 and starts the movement of the power gauge indicator 86. A third depress will register the power of the pitch as a function of the indicator 86 position. After the third time that a button is depressed, the pitch animation sequence begins and the game proceeds. The flow process for inputting the user's pitch selections and other game functions can best be described by a detailed explanation of FIGS. 4–7.

A continuous flow diagram of the presently preferred top-level process flow for the present invention is shown in FIGS. 4a–4e. The game process begins from a start state 100 and enters state 102 where all of the games initial parameters are set. These parameters include, but are not limited to, the internal initialization of software variables and subroutines. Any number of these variables may be determined through initial user selection before a baseball game begins. For example, a user might be given the option to select various individual players as part of the user's team. As discussed previously, in accordance with the present invention, a user will be able to initially select various pitchers with certain special pitch qualities. As an alternative, a player may be able to only make selections of entire teams and not individual players. Also, any combination of selection options may be employed. For instance, when a user is playing against the computer, the user may be offered individual player selections for himself or herself but may be offered team selections for the opposing player (i.e., computer). In this manner, a player would be able to gradually increase the skill level of opposing teams as the player's own skill level increased. Under the present invention, it can be appreciated that any number of options relating to the playing of a baseball game can be initially presented to the player.

Once the initial parameters are determined, the flow moves to a process state 103 in which the status of the currently-played game is determined. Specifically, while in state 103 the pitch count, number of outs, score, and inning are updated to determine whether the game process will continue or end. Throughout the game flow process, as will be seen later, control returns to state 103 to update the game status. This will most often occur after each pitch is thrown to the batter.

Once game status has been updated, the process flow enters decision state 104 where it is determined if the video game is over. In accordance with the present invention, this determination may be made dependent upon elapsed time recorded since the beginning of the game. Alternatively, the video game may not end until an entire nine innings are played, or until the baseball game is over (assuming extra innings are required), or lastly, the video game may not be over until the player has lost a baseball game even if multiple teams need to be played. If video game play is not over, then flow proceeds into decision state 108. However, if video game play is over, as determined by a number of possible scenarios, then flow will proceed into state 105 which will display on the video screen an option to proceed with the current game, or start a new game, upon depositing a quarter. After this option is displayed, the game flow will enter decision state 106 and wait for a brief period until either a quarter is deposited or a timeout default occurs. If a quarter is deposited while in state 106, then play resumes with flow passing into decision state 108. Otherwise, game flow will proceed to state 107 where the game will end.

Once in state 108, the computer will determine if any runners from the batting team are currently on base. If there are runners on base, the control flow continues to state 110 where the coaching strategies for the baserunners are first displayed. The flow remains in state 110 for a brief period to give the player a chance to select a particular strategy. Once a strategy is selected by pressing the appropriate button, or if a certain amount of time has elapsed with no button depress, game flow enters state 111 where the appropriate coaching commands, as determined by the player selection, are given to the baserunners. If no button was depressed within the allotted time period, then a default setting will be given to the runners. The default setting may simply be to hold all the runners, or may be more elaborate depending on game variables such as score, inning, etc.

Figure 4:
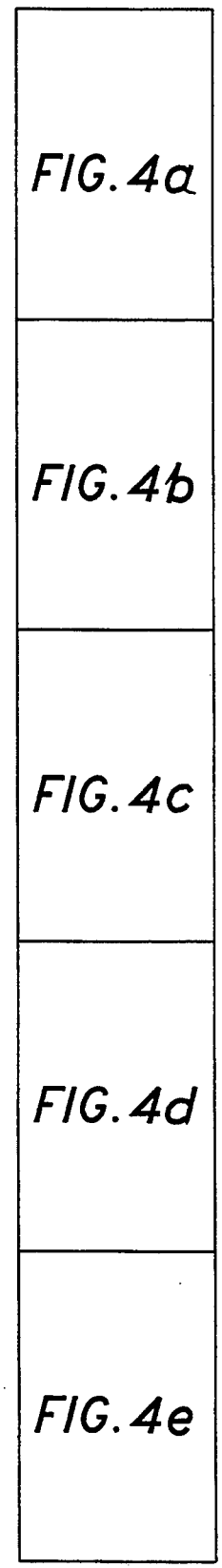
FIGS. 4a–4e are flow diagrams of the operational process of the present invention used in the presently preferred game unit.
Figure 4A:
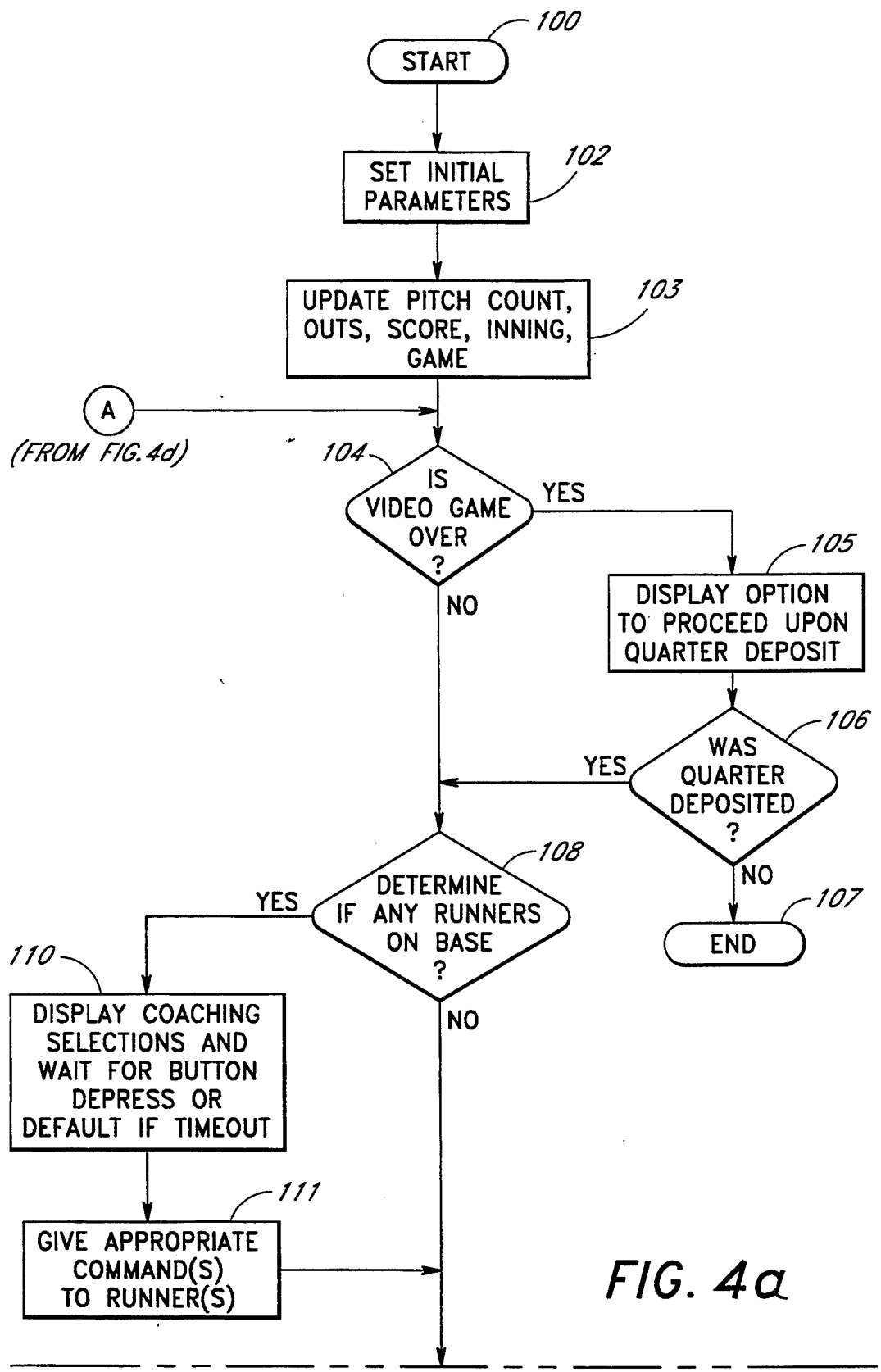
Figure 4B:
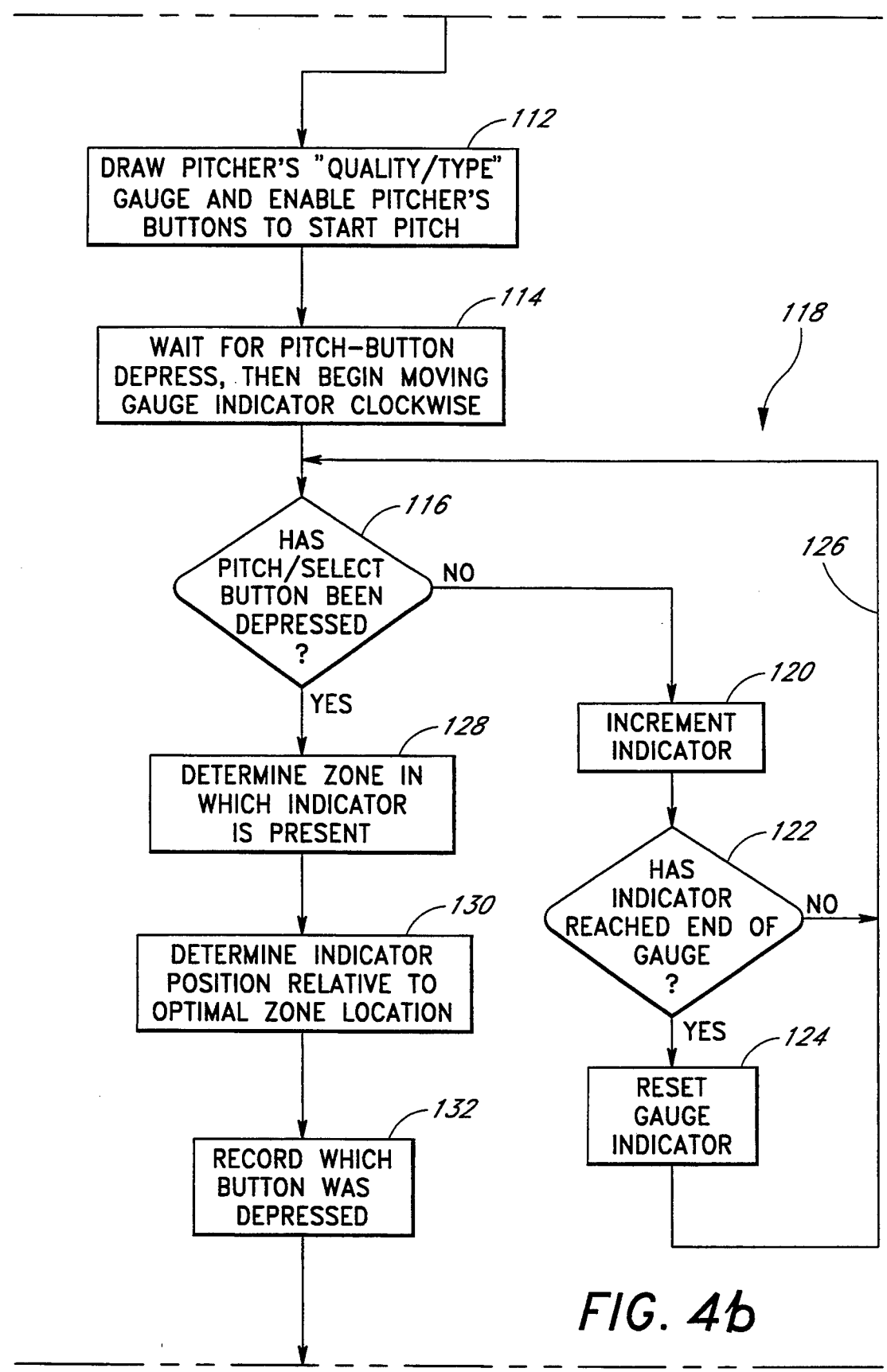

Upon leaving state 111, the game flow proceeds to FIG. 4b and into state 112. State 112 is also entered directly via state 108 if it was determined that no runners were on base. Once in state 112, the feedback gauge 66 (FIG. 3a) is displayed on the video screen depicting the various types and quality levels of pitches. The pitcher's 3-button control panel 20 (FIG. 1b) is enabled in state 112 and the flow proceeds to a wait state 114 where the pitch selection process will begin upon a depress of any of the pitcher's three buttons. Once a button is depressed for selection of the pitch style (i.e., curve, fastball, special pitch) the gauge indicator 74 begins movement in a clockwise direction and game flow then proceeds to decision state 116. At decision state 116 it is determined whether a second button depress has occurred. If a button has not yet been depressed, then the game flow will enter and remain in loop 118 until there is a selection or until a timeout occurs.

More specifically, upon exiting state 116 for failure to depress one of the buttons 34, 35, 36, the process enters state 120 in which the position of the gauge indicator 74 is incremented and redrawn. Process flow next transfers to decision state 122 where the position of the indicator 74 is checked to determine if it has reached the end of the gauge 66. If the indicator 74 has travelled to the end of the gauge 66, then game flow proceeds to state 124 and the indicator is reset to the beginning of the gauge 66. If the process flow is at decision state 122, and the indicator has not travelled to the end of the gauge 66, then game flow would proceed via path 126 back to decision state 116. Similarly, if the indicator 74 had reached the end of the gauge 66 and was reset in state 124, game flow would also continue via path 126 into decision state 116. In this manner, the gauge indicator 74 is continuously incremented and the button panel 20 is continuously monitored until a selection is made.

After a button selection is made, process flow exits loop 118, or specifically decision state 116, and enters state 128. In state 128, the current indicator position is used to index into one of the three gauge regions 68, 70, 72 (FIG. 3a). Each region will correspond to a particular type of throw (i.e., pick off 68, pitch out 72, or ordinary pitch 70). Following this determination, flow proceeds to state 130 where the pitch quality is set as a function of the indicator position relative to the optimal zone location designated by markers 76, 78, and 80. Game flow then moves into state 132 where the specific button that was depressed in state 116 is recorded. This determines what style of pitch will be thrown (i.e., curve ball, fastball, special pitch). Hence, after game flow has exited state 132, the player has already greatly affected the upcoming pitch by controlling the pitch type, pitch quality and pitch style. However, at this point the player controls another facet of the pitch, i.e., power as can be seen by reference to FIG. 4c.

In an alternative embodiment of the present invention the selection of the pitch quality can be made to simulate the fatigue experienced by a real pitcher in a baseball game. In such an embodiment, the marker 80 which symbolizes a perfect pitch will begin moving counterclockwise once the indicator enters region 72 so that the indicator 74 and marker 80 will be moving in opposite directions. This movement will make it more difficult for the user to select a perfect quality pitch and will simulate the difficulty a pitcher has in obtaining a perfect quality pitch every time. Additionally, to mimic the way in which fatigue will onset in the later innings and progressively worsen, the marker 80 can be set to begin moving in, say, the fifth inning, and then move progressively faster in the later innings. In this manner, it will become increasingly difficult for a user to make a perfect pitch.

Figure 4C:
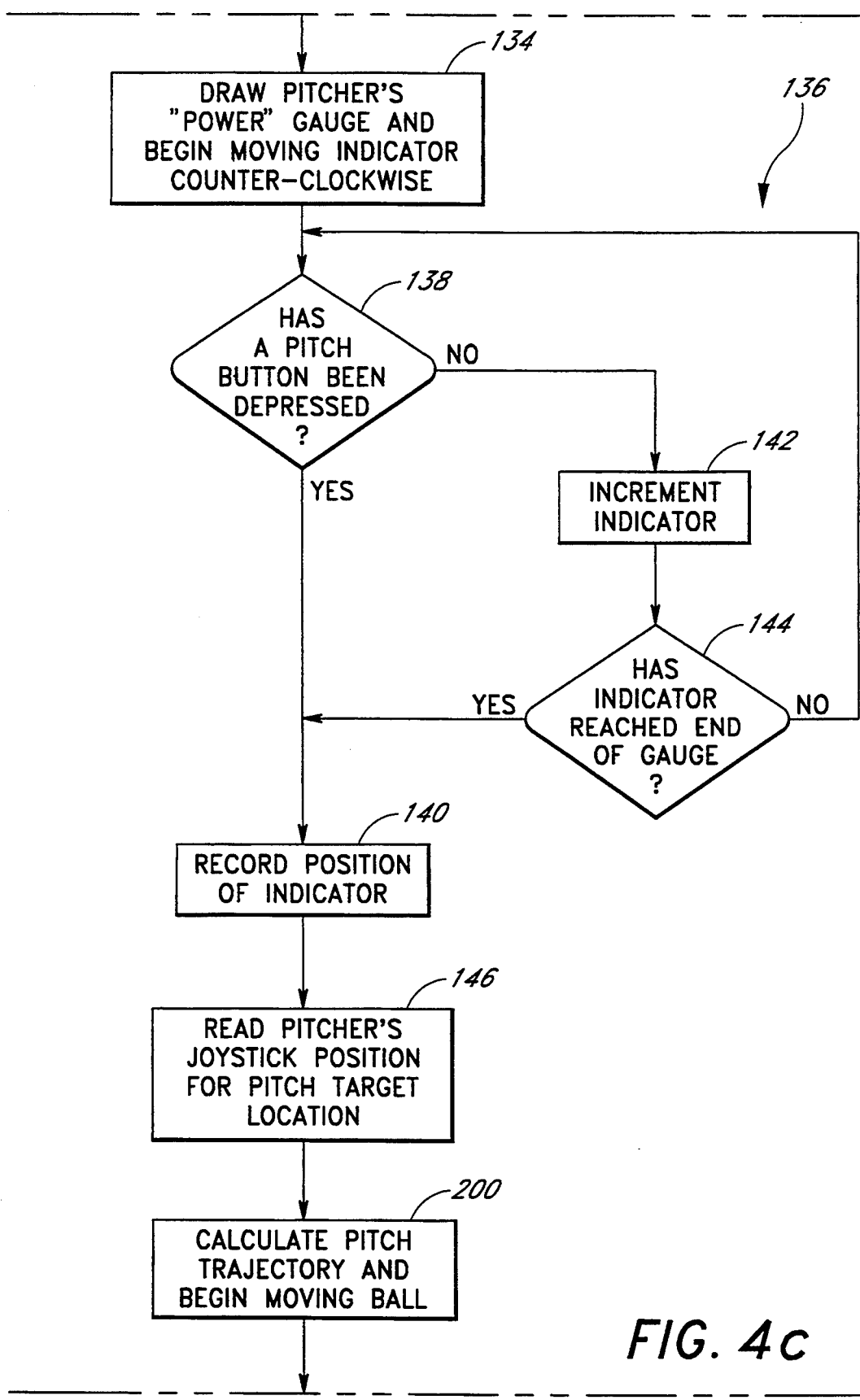

FIG. 4c represents the continuation of the process flow shown in FIG. 4b. After recording the player's selection for pitch style, the "power" feedback gauge (FIG. 3b) is displayed on the video display 48 (FIG. 2) during state 134. While in state 134, the indicator 86 for the power gauge 82 begins movement in a counterclockwise direction. In a similar manner as with gauge 66, the flow enters a loop 136 in which the indicator is incremented until a power selection has been made. Specifically, game flow enters decision state 138 where the buttons 34, 35, 36 (FIG. 1b) are monitored to determine if any of them have been depressed. If a button was depressed, the position of the indicator is recorded in state 140 and thus the power of the pitch is determined.

However, if a button was not depressed, the flow remains in loop 136 and continues through state 142, where the indicator is incremented, and into decision state 144. Unlike loop 118, loop 136 will not permit the indicator to be redrawn. Hence, decision state 144 determines if the indicator has reached the end of the gauge and if so, flow exits loop 136 and proceeds to state 140 where the indicator position is recorded.

Once the power of the pitch has been set, a final pre-pitch input is made in state 146. Specifically, the directional control of the pitch is determined as a function of the position of the pitcher's joystick 16 (FIG. 1b). The various joystick positions will correspond to locations within the strike zone. For example, if a player wants a pitch to be thrown generally to the high and inside position of the strike zone, the player moves the joystick 16 to a forward position and either left or right, depending on the orientation of the batter. While the present invention employs a joystick control to select pitch target locations, any suitable input device could of course be used such as a trackball or another set of buttons. The joystick position that is determined in state 146 will be recorded at the same time, or immediately after, the power level is selected.

Upon leaving state 146, the player has inputted a total of five various pitch factors, each of which will affect the upcoming pitch in a separate manner. These five factors are the throw type, pitch type, pitch quality, pitch power, and pitch target location. It is this expanded user controllability in the present invention that separates it from previous electronic baseball games. A player of the present invention is given nearly complete control over the pitch as opposed to other games where a computer randomly generates many of the various factors that determine the trajectory of a pitch.

From state 146, process flow travels into state 200 in which the pitch trajectory of the baseball is calculated and used to display the baseball on the video display 48 (FIG. 2). The operations of function 200 are represented in expanded form in FIGS. 5a and 5b as will be discussed later. The game process exits function 200 of FIG. 4c and enters a loop 220 shown in FIG. 4d. While the game flow is in loop 220, the ball movement towards the plate is displayed while the game awaits an indication that the batter is swinging.

Figure 4D:
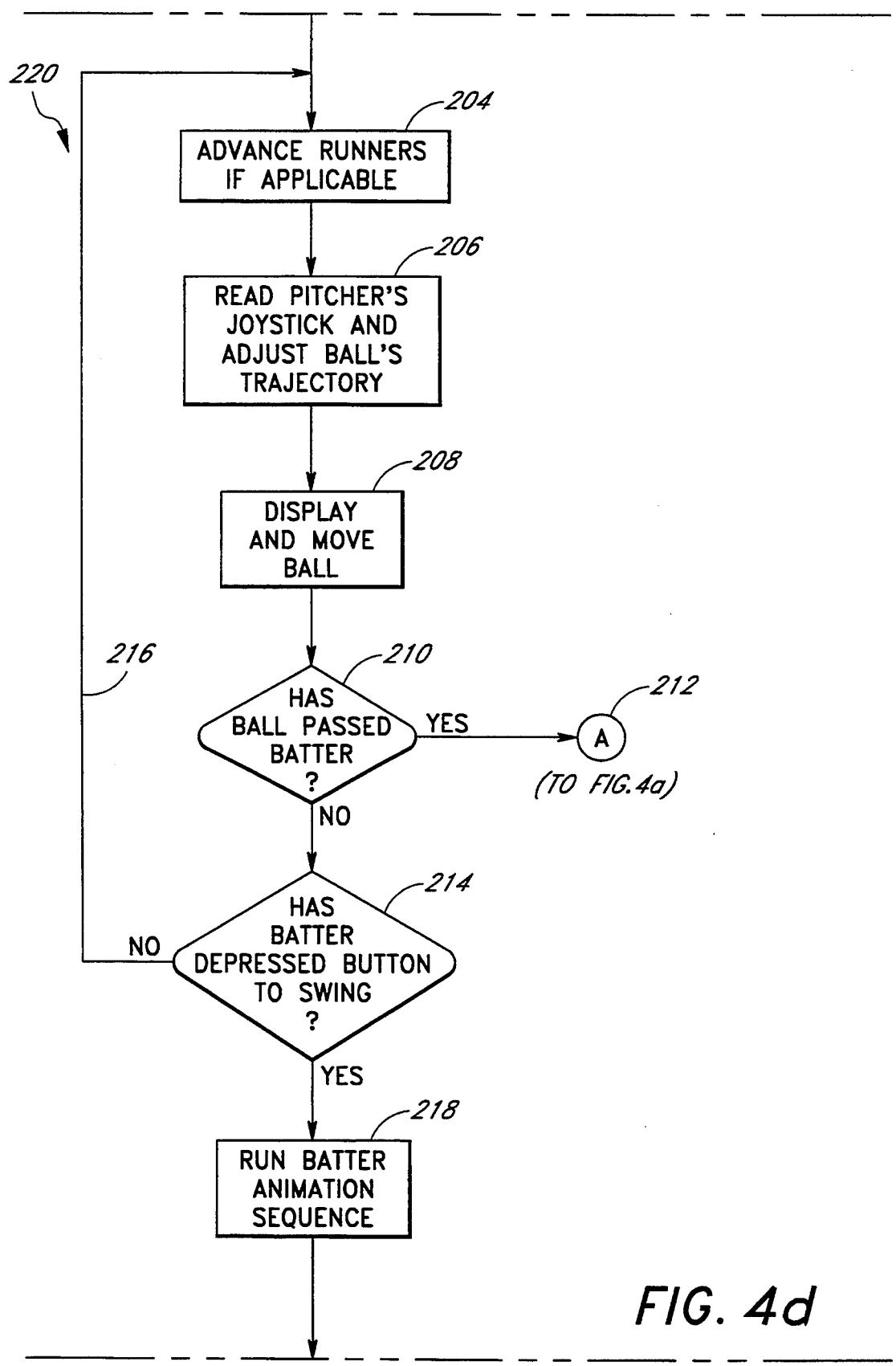

In FIG. 4d, loop 220 begins in state 204 where the base runners are advanced if required, that is, if any runners are on base and the particular coaching strategy selected requires runner advancement. After advancement of the runners, the pitcher's joystick 16 (FIG. 1b) is again monitored during state 206 to allow for positional control of the pitch while the ball is in flight towards the catcher. If the joystick 16 is in a position other than the center position and the flow control is in state 206, then the pitched ball's trajectory will be adjusted accordingly. Any variation in pitch trajectory will be dependent upon, among other things, the sensitivity attributed to the joystick control 16. The sensitivity will be determined during state 200 and will be more fully discussed in conjunction with FIGS. 5a and 5b. From state 206, process flow enters state 208 where ball position is updated on the video display 48. After the ball position is updated in state 208, the process flow remains in loop 220 until either the pitched ball has passed the batter, or until the batter presses a button on the panel 22 to start a swing. Specifically, the game flow will enter decision state 210 to determine if the ball has passed the batter and hence that the pitch is over. If the ball has passed the batter the process flow enters state 212 which merely returns the flow back to state 104 of FIG. 4a. As mentioned previously, the game status will be updated in state 104, and either the pitch process will begin again or the game will be over.

Referring to FIG. 4d, if the ball has not yet passed the batter then process flow continues into decision state 214 in which the batter's buttons are monitored to determined if the player is swinging. If the buttons do not yet indicate a swing then the game flow remains in loop 220 and travels via path 216 back to state 204. If during a pitch, it is determined that the batter has depressed one of the swing buttons 37, 38, 39 (FIG. 1b), process flow exits loop 220 and enters state 218 which begins the batter animation sequence. In the presently preferred embodiment, it will be necessary to hold a swing button depressed for the duration of the swing if the swing is to be fully executed. The swing button must be continually depressed because the batter has the option to create a "checked" or aborted swing by lifting his finger from the swing button after the batter begins the swing animation. However, if the user tries to "check" the swing too late and the bat is in the strike zone, then the count will register a strike for that pitch. It is possible, however, that even though the swing was checked, the ball will be close enough to hit, in which case the process flow will continue but the batter will have a decreased possibility to hit the ball successfully.

Figure 4E:
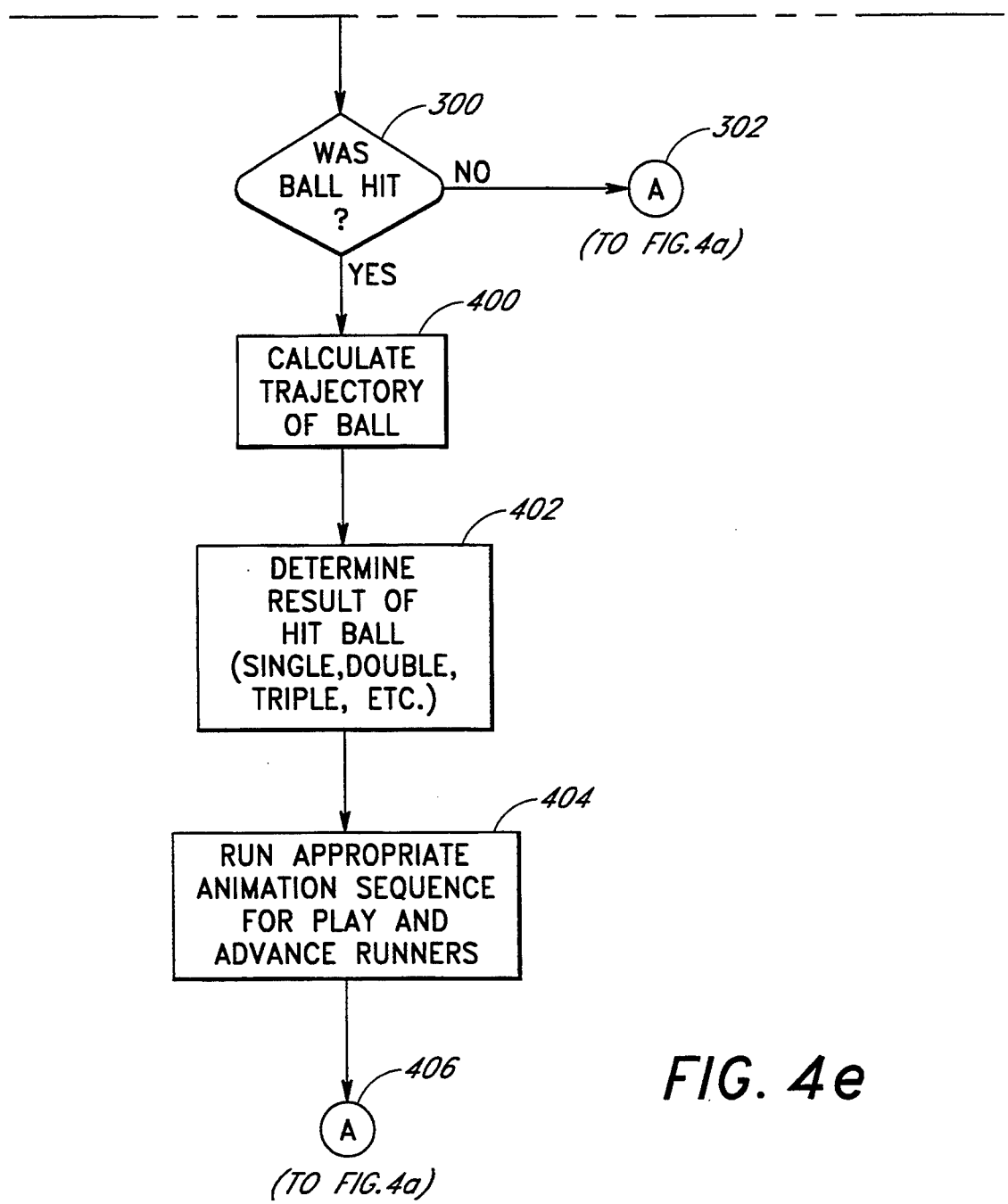

From state 218, flow advances from FIG. 4d over to FIG. 4e and into function 300 where the computational determination is made whether the ball was successfully hit by the bat. The specifics of this determination are more fully explained in conjunction with FIGS. 6a–6c which represent an expanded version of function 300.

Figure 7:
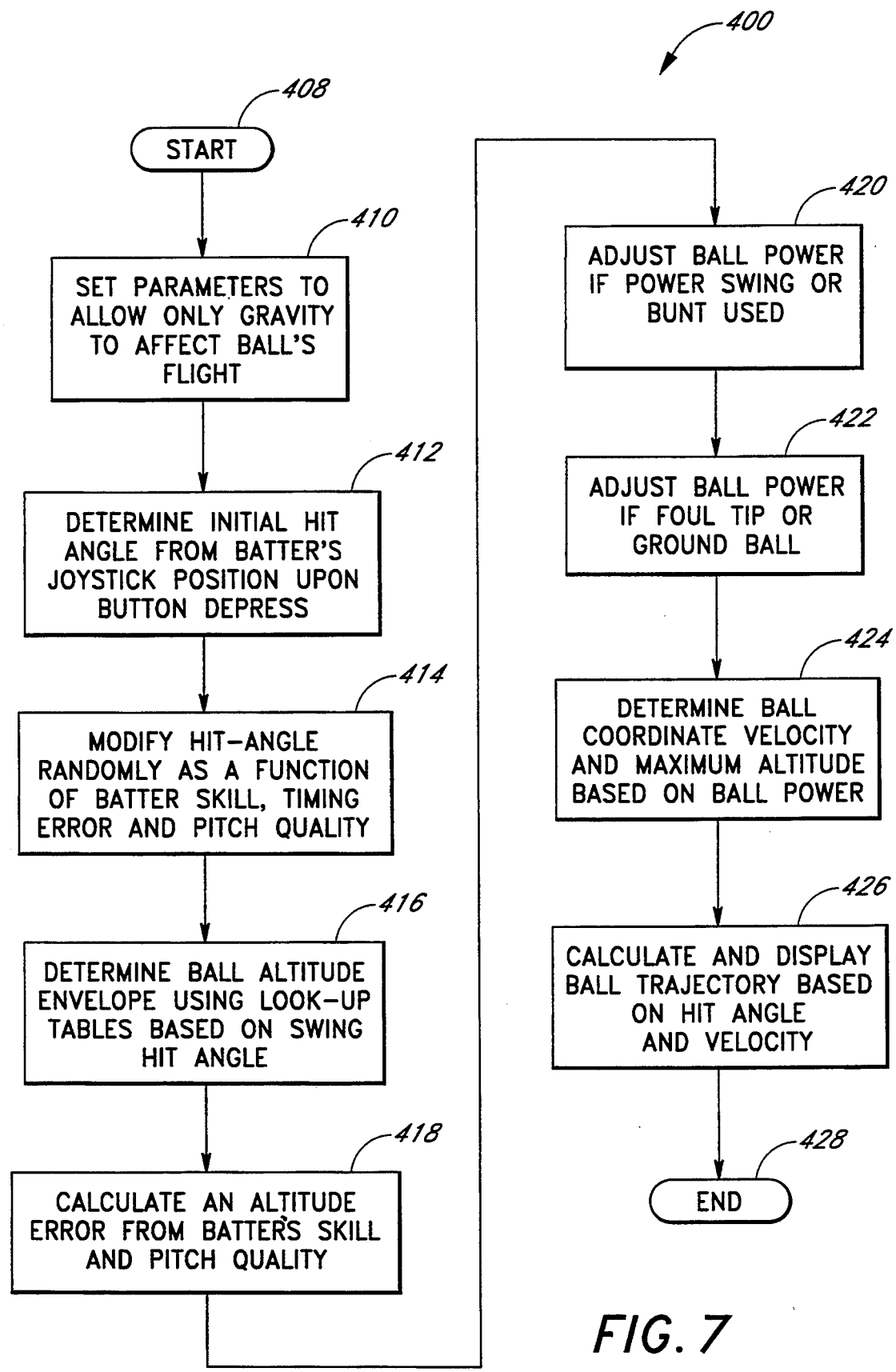
FIG. 7 is a flow diagram of the computation for the batted baseball trajectory function as shown in FIG. 4e.

From decision function 300, flow will proceed to state 302, and eventually on to state 104, if the ball was not hit. A successfully hit ball, however, will cause the game flow to exit function 300 and enter function 400 where the trajectory of the hit ball is calculated based on much of the data previously inputted by the user. A flow chart of the steps in calculating the ball trajectory is shown in FIG. 7 and will be discussed below.

Continuing to refer to FIG. 4e, after a trajectory for the hit ball is calculated, flow proceeds to state 402 where the result of the hit ball is determined as a function of the trajectory. As will be explained in the discussion of FIG. 7, many of the user inputs will greatly affect the trajectory of the hit ball and this trajectory will correspond to a set of possible results for the hit ball (i.e. single, double, triple, out, double play, etc.). It is from this set of possible results that a final outcome is determined in state 402. The present invention will use the calculated trajectory and choose from a matrix or series of matrices stored in the memory of the computer 42 (FIG. 2), the corresponding result of the hit baseball. It is desirable to create a matrix system large enough so that slight variations in ball trajectories will correspond to a separate matrix location resulting in more varied and realistic game play. Of course, with the infinite number of trajectories possible for a hit ball and limited number of plays, it is inevitable that different ball trajectories will create the same result. However, accounting for many different ball trajectories allows a much more unpredictable and varied outcome which enhances user interest in the game.

Also, while in state 402, the present system 10 maximizes its realistic effect by attributing several possible outcomes to a given ball trajectory and then determining the result based upon such previously input factors as pitch quality and swing timing. Once the result of the hit ball is determined, flow enters state 404 where the appropriate animation sequence is displayed on the video screen to include the previously hit ball and the advancement of any runners on base. After the animation sequence has ended, then flow enters state 406 where control returns back to update state 104.

Figure 5B:
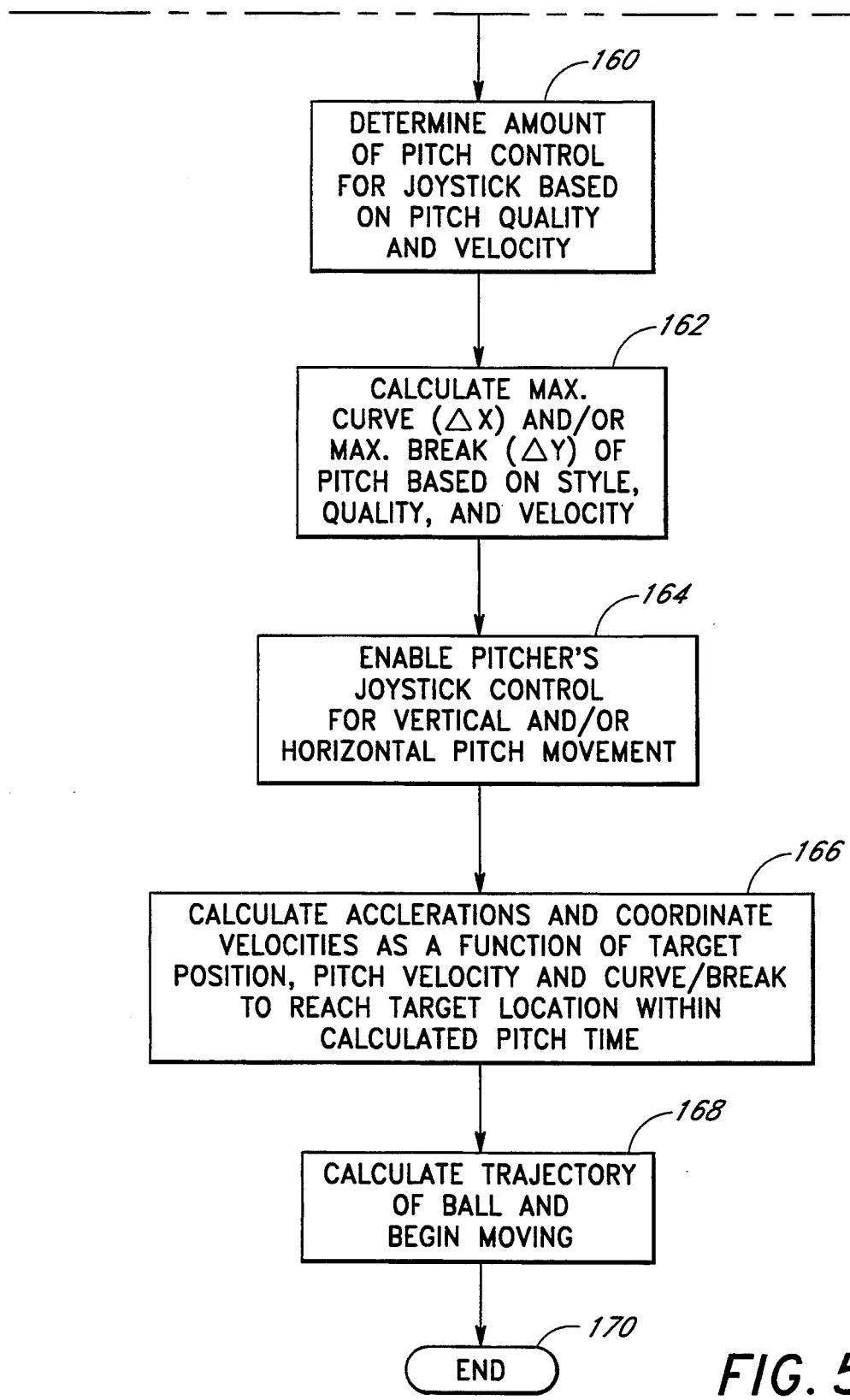
FIGS. 5a,b are expanded diagrams of the pitch-trajectory computation function shown if FIG. 4c.

As discussed in conjunction with FIG. 4c, the trajectory of a pitched baseball is calculated in state 200. FIGS. 5a and 5b depict, in expanded flow chart form, the operation performed in state 200. As shown in FIG. 5a, the operation of state 200 commences in a start state 148 and proceeds to state 150 in which the final velocity of the ball upon release from the pitcher is determined. The velocity will be determined as a function of the style of pitch and the pitch power selected by the user. Specifically, for a given style of pitch there will be a certain range of obtainable velocities and the particular velocity chosen will depend on the amount of power applied.

From state 150, system operation proceeds to state 152 where the target location of the pitch is set based on the reading of the pitcher's joystick obtained in state 146. Because the velocity of the pitch is known and the distance to the plate is constant, the time for the pitch to travel to the plate is next calculated in state 154. With the ideal target location determined in state 152 and the pitch travel time calculated in state 154, flow enters state 156 where an error distance from the ideal target location is determined. In a real baseball game, a pitcher's attempted throw at a specific portion of the strike zone will inevitable deviate somewhat based on two primary factors. These factors are the pitch quality achieved by the pitcher as determined by the precise grip obtained on the ball, and the speed at which the pitcher attempts to throw the ball. Likewise, in the present invention, the error distance is calculated as a function of both the quality of the pitch and the power of the pitch selected by the user. This calculation approximates the real world factors that determine the trajectory of a pitch. After the error distance is calculated, system flow then proceeds to state 158 where a random angle is chosen for the direction of the error distance. Because a pitcher cannot accurately predict the direction his pitch may wander, use of a random function in state 158 only serves to approximate the real world results of stray pitches.

Upon exiting state 158 of FIG. 5a, the game operation will proceed to state 160 of FIG. 5b where the "sensitivity" or the amount of pitch control attributed to the pitcher's joystick is determined. The sensitivity is also calculated as a function of pitch quality and pitch velocity whereby pitch control will be greater for a higher quality pitch and less if the maximum power is applied to a pitch. To determine a path that the pitched ball will take to the plate, flow proceeds to state 162 where the horizontal displacement (maximum curve) and the vertical displacement (maximum break) are determined based on the user selections for pitch style, pitch quality and pitch power.

Once the pitch envelope has been determined, the pitcher's joystick is enabled in state 164 to allow for pitch movement in either or both of the horizontal and vertical directions. The style of pitch selected by the user will determine whether and in which direction pitch control will be allowed. For example, if a sinker pitch is selected, control may be limited to only the vertical component while if a curve ball is selected, control may be limited to the horizontal component of the pitch. Likewise if a fastball is chosen, pitch control by the joystick may be disabled while the ball is traveling to the catcher.

From state 164, the flow continues into state 166 where the individual coordinate rates for velocity and acceleration are calculated for the pitch path that will enable the baseball to reach the target location within the allotted travel time. Such coordinate rates are necessary to accurately display the baseball as it moves towards the plate while curving outwards and inwards and dropping towards the ground. Once the coordinate rates have been calculated the entire ball trajectory is determined in state 168. Also in state 168, the ball is displayed and will begin to move towards the plate. Flow then proceeds to an end state 170 and will next enter loop 220 as explained previously in the discussion of FIG. 4d.

Figure 6:
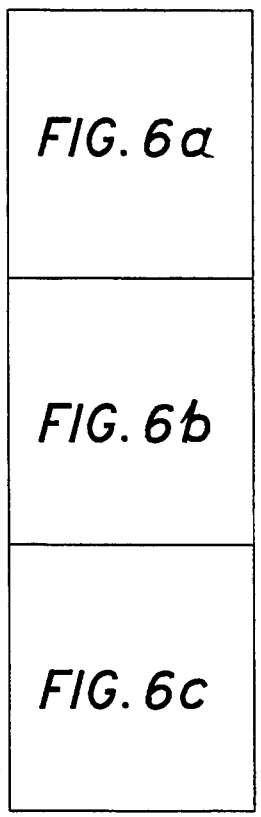
FIGS. 6a–6c are flow diagrams of the possible-hit determination function shown in FIG. 4e.
Figure 6A:
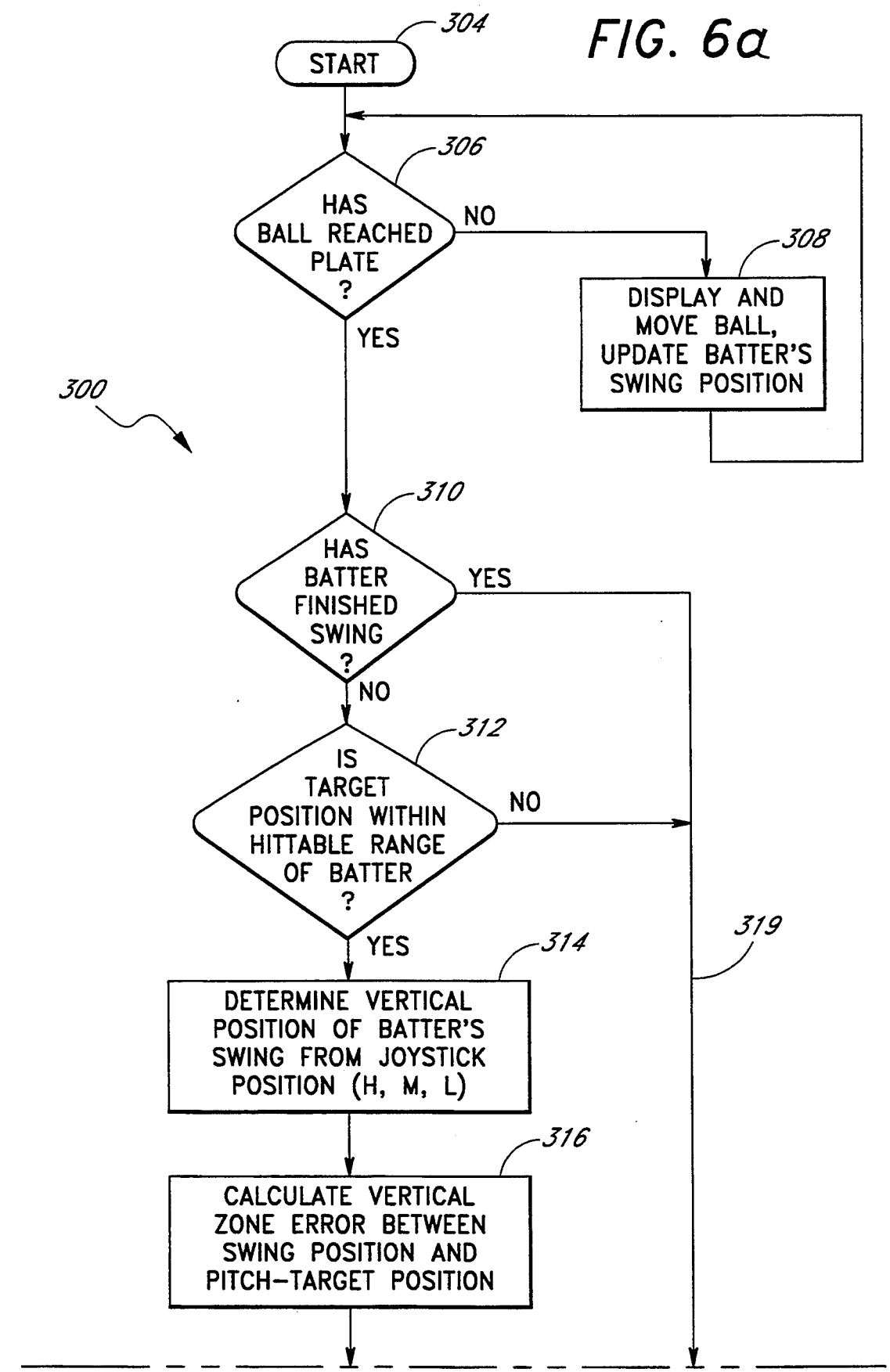
Figure 6B:
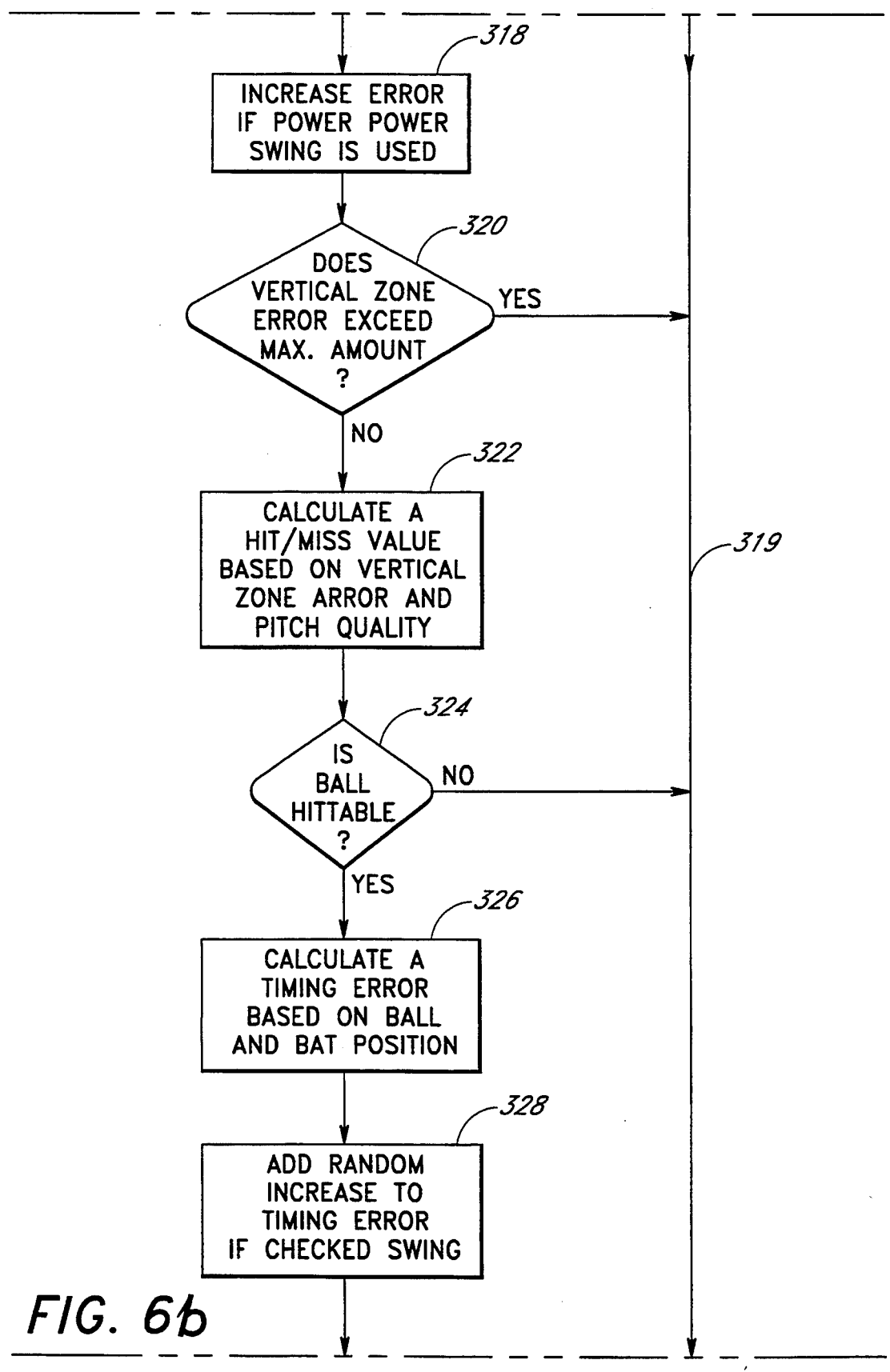
Figure 6C:
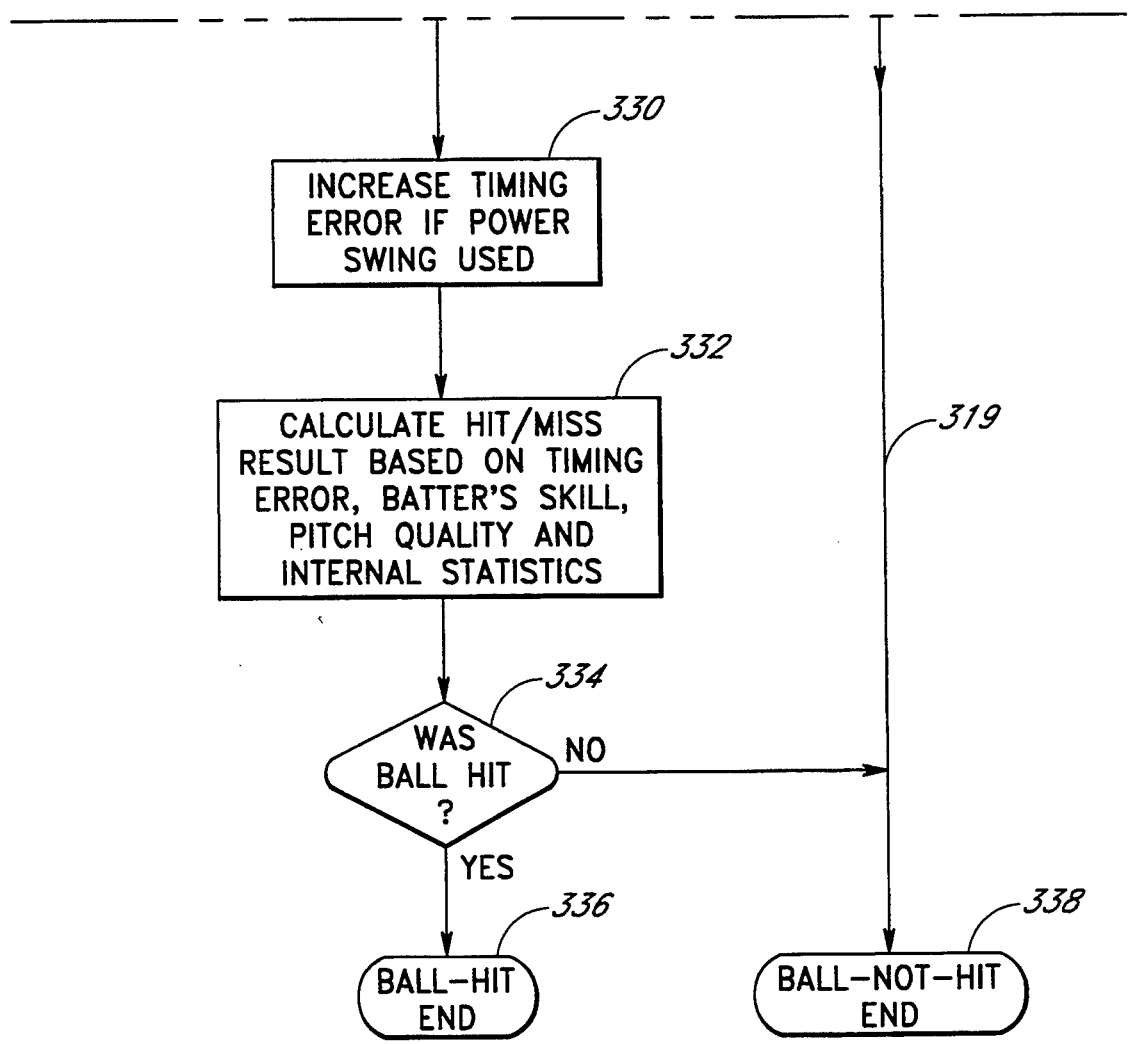

FIGS. 6a-6c depict decision function 300 in expanded flow chart form to show the detailed operations performed in that state. A start state 304 is shown in FIG. 6c where the process for function 300 begins. The flow next proceeds through three decision states, the first of which is decision state 306 where it is determined if the pitched baseball has yet reached the plate or the strike zone. The process within function 300 will not proceed past decision state 306 until the ball has reached the plate. Instead, the position of the pitched baseball will be continually updated and displayed on the video display 48 (FIG. 2) as the process alternates between state 308 and decision state 306. To reach function 300 the batter must have begun to swing, therefore the batter's swing position will be updated and displayed in state 308 along with the ball position.

Referring specifically to FIG. 6a, within a brief period the ball will reach the plate and control will fall out of decision state 306 into decision state 310 which determines if the batter has finished the swing. If the batter has finished swinging then the batter obviously swung too early and the pitch is over. Accordingly, process flow will exit decision state 310 and travel via path 318 onto state 338 which is an end state that does not result in a hit ball. This state corresponds to a "no" response from decision function 300 which asks if the ball was hit. If it is determined in state 310 that the batter has not finished swinging then the bat and ball are both near the strike zone at the same time and flow continues on to decision state 312.

Within decision state 312 it is determined just exactly how near the strike zone the pitched baseball is. If the target position of the baseball is not conceivably hittable by the batter (i.e., a ball was thrown) then flow exits state 312 and travels via path 318 to state 338. Otherwise, the game process for this pitch will continue into state 314 where the vertical position of the batter's swing relative to the strike zone is determined. In the present invention, the strike zone is broken into three vertical regions—high, medium and low—although it is possible to use a larger number of regions if desired. However, because the presently preferred embodiment allows a batter to direct the batted ball upward, downward or with an average altitude, the use of three regions correlates to the batter's directional choices. For example, if a batter pushes the joystick forward in an effort to hit a pop fly ball then the batter's swing will correspondingly be through the lower section of the strike zone to simulate a looping swing.

After the vertical position of the batter's swing is determined in state 314, a vertical zone error is calculated in state 316 as the difference between the vertical swing position and the pitch target position. The game flow continues after state 316 to state 318 shown in FIG. 6b. While in state 318, the vertical zone error will be increased if a power swing was selected by the batter. Thus, after the final value for the vertical zone error is calculated, the process enters a decision state 320 in order to determine if the zone error exceeds a maximum amount. If the zone error is above this maximum amount then a hit will not be allowed because the ball and bat position are too far apart. Accordingly, the flow will follow path 319 and into state 338. The hit or miss determination will continue from state 320 into state 322, however, if the vertical zone error is less than a pre-specified maximum amount. The particular value for the maximum vertical zone error can be set to any value to allow for realistic baseball play. It may also be desirable to have the vertical zone error change during a particular game or against a certain team.

Up to this point, in the operation of function 300, the decisional questions have been in order to determine the proximity of the ball and the bat. It should be pointed out that the specific tests for the location of the bat and ball differ from those used in the prior art for several reasons. First, in the present invention the test to determine location of the ball and bat is not dispositive if the ball and bat are not in actual contact. That is to say, while other inventions have required an absolute coincidence between the ball and the bat to obtain a hit, the present invention as described in one preferred embodiment, from states 304-320, performs a different function by ruling out the possibility of a hit only if the ball and bat are separated by a relatively large distance. In doing so, the present invention considers, among other things, the relative vertical positions of both the bat and ball. Consequently, it remains possible to hit the ball as long as the bat and ball are merely "close" together which will always be the case upon entering state 322.

Referring to FIG. 6b, once in state 322, a hit/miss value is calculated based on the pitch quality and the value for the vertical zone error that was previously determined essentially, the calculation performed in state 322 will normalize the amount of error in conjunction with the pitch quality and return a value to decision state 324. Within decision state 324, it is determined if the hit/miss value is within a range where the ball could be hit. Use of pitch quality in the calculation for state 322 in conjunction with decision state 324 will seek to eliminate a possible hit in those cases where the vertical zone error was large but less than the maximum amount, and the pitch quality was very good. If the hit/miss value exceeds a certain range then the ball is not hittable and flow proceeds via path 318 and into state 338. On the other hand, if the ball is hittable then the process continues through states 326-334 where the timing of the bat and ball is considered to make the final determination of whether the ball will be hit.

While the presently preferred embodiment employs one particular method of determining the relative positions of the bat and ball to rule out the possibility of a hit, it is the timing function that has the greatest impact on the determination of whether, or how well, a ball is hit. Specifically, a raw timing error is first calculated in state 326 based on the horizontal positions of the ball and bat within the strike zone. Then, the process enters state 328 where a random increase to the timing error is made if the batter has made a checked swing at the pitch, by releasing the swing button, and has thus only inadvertently created the possibility of hitting the ball.

The flow continues in state 330 of FIG. 6c where another increase to the timing error is made if a power swing was selected by the batter. This increase obviously serves to duplicate the increased difficulty of hitting a ball when attempting to knock it out of the stadium. The timing error, which has already been determined as a function of the type of swing used by the batter and the relative positions of the bat and ball, is next used to calculate a new hit/miss value. The new hit/miss value is calculated in state 332 and will vary according to the timing error calculation, the batter's skill, pitch quality, pitch style and pre-determined internal statistics stored in the computer. The value returned in state 332 will categorize the result of the swing as either a hit or miss, and if a hit, the value will be used in state 402, shown in FIG. 4e, to determine how well the ball was hit. Once the hit/miss value is calculated, the final decisional state 334 is reached which directs the process to state 338, and eventually to state 104, if the ball was not hit, or to state 336 if the ball was hit.

As was discussed in conjunction with FIG. 4e, once it is determined in function 300 that the ball was hit, the flow will pass to function 400 where the trajectory of the ball is calculated. FIG. 7 is a flowchart showing the specific functions performed in function 400. The operation for function 400 begins in start state 408 and proceeds to state 410 where parameters that will determine the trajectory of the ball are set to allow only gravity to affect the ball's path during flight. The initial hit angle is then determined in state 412 based on the batter's joystick position at the time a button was depressed in state 214. This initial hit angle is next slightly modified, while the process is in state 414, as a function of the batter's skill, the previously calculated timing error (which itself is a function of several variables), and the pitch quality.

Now that the direction of the ball is known, the altitude envelope for the hit ball will next be determined in state 416 using a series of look-up tables that contain altitude data as a function of the ball's hit angle. With the altitude envelope selected, operational flow travels to state 418 where an altitude error is calculated as a function of the batter's skill and the pitch quality. A predetermined power value will be assigned to the ball representative of a normal swing selected by the batter. An adjustment increase or decrease will be made to this value in state 420 if the batter has selected a power swing or bunt, respectively. Similarly, the ball's power will again be adjusted accordingly in state 422 if the hit angle and altitude envelope indicate that a foul tip or ground ball is imminent.

With the ball altitude and power known, the flow continues on to state 424 where the maximum altitude is determined as a function of the ball power and the selected altitude envelope. The altitude error calculated in state 418 is then used to adjust the maximum altitude for the batted ball. From the maximum altitude data, the initial vertical coordinate velocity is easily calculated with gravity being the only acceleration factor. Next, in state 426, the final calculations are made to determine the horizontal coordinate velocity so the entire trajectory path of the ball can be determined. Hence, the ball's trajectory is determined by the initial hit angle and the initial velocity of the ball coming off the bat. Flow next proceeds to the final state 428 of FIG. 7 and eventually on to state 402 of FIG. 4e so that the result of the hit ball can be determined and displayed on the video display 48 (FIG. 2).

Through the foregoing description and accompanying drawings the present invention has been shown to have important advantages over the current devices and methods used to simulate baseball games. Specifically, the amount of user control over the pitching, batting, and coaching functions is greatly enhanced to simulate a more realistic game of baseball. Also, the extensive use of the ball and bat timing function, in conjunction with other user-inputted date, to determine whether, and how well, a ball will be hit is unique to the present invention.

While the above detailed description has shown, described and pointed out the fundamental novel features of the invention as applied to various embodiments, it will be understood that various omissions and substitutions and changes in the form and details of the device and process illustrated may be made by those skilled in the art, without departing from the spirit of the invention.

What is claimed is:

1. A baseball simulation system, comprising:
   a computer;
   a video display connected to said computer;
   means for simulating and displaying on said video display a representation of a baseball playing field wherein said field includes a plurality of baseball players;
   a plurality of user input devices for inputting a plurality of variable input parameters wherein said parameters are provided to said simulating means for influencing control of pitching and batting;

control means for determining the direction of a batted ball displayed on said video display wherein said direction is a function of timing between a batter's swing and a pitched ball and at least one other of said variable parameters; and means for generating visual feedback to a user for selecting two of said parameters to influence a path of said pitched ball, said two parameters comprising a pitch quality value and a pitch power value, and wherein said path of said pitched ball is a function of said pitch quality value and said pitch power value.

2. The system as defined in claim 1, wherein one of said user input devices comprises a batter's joystick control and the direction of said batted ball is determined as a function of timing and joystick position.

3. The system as defined in claim 1, wherein said baseball players include a pitcher, a batter, at least one base runner, and a plurality of fielders.

4. The system as defined in claim 1, wherein said visual feedback means includes means for displaying a gauge indicative of said pitch quality value and means for displaying a gauge indicative of said pitch power value.

5. The system as defined in claim 1, further comprising means for determining the path of said pitched ball as a function of a plurality of said user input parameters wherein said path is affected in three-dimensions based on said input parameters.

6. The system as defined in claim 5, wherein said user input parameters include pitch style, pitch power, pitch quality and pitch target location.

7. The system as defined in claim 1, further comprising means connected to said user input devices for enabling a user to select offensive base-running strategies before a baseball is pitched.

8. The system as defined in claim 1, wherein said user inputs include a batter button control panel, a pitcher button control panel, a batter joystick and a pitcher joystick.

9. A game system, comprising:
a processor including a memory;
a video display connected to said processor;
means for simulating and displaying on said video display a representation of a baseball playing field wherein said field includes a plurality of baseball players;
a plurality of user input devices connected to said processor for inputting a plurality of game parameters; and
means for determining a three-dimensional path of a pitched baseball as a function of said plurality of game parameters.

10. The system as defined in claim 9, wherein said game parameters comprise a pitch quality value and a pitch power value, said determining means further comprising means for generating visual feedback to a user for selecting said pitch quality value and said pitch power value.

11. A game system as defined in claim 10, wherein said means for generating visual feedback to a user visually represent changes in one of said pitch quality and said power value occurring with time and wherein user selection of a desired one of said pitch quality and said power value is based on skill of said user in making said selection in response to said visually represented changes.

12. The system as defined in claim 10, wherein one of said user input devices is a pitcher's joystick, one of said parameters representing a position of said joystick, wherein said path of said pitched baseball is determined as a function of the position of said pitcher's joystick before said pitched baseball is thrown and while said pitched baseball is in flight.

13. The system as defined in claim 10, wherein said generating means provides to said video display a gauge for displaying pitch types and relative pitch quality, and a gauge for displaying pitch power.

14. The system as defined in claim 13, wherein said user input devices include a position control device and a button select device.

15. The system as defined in claim 10, wherein said determining means includes means for determining the direction of a batted ball as a function of timing between the batters swing and a pitched ball and as a function of said pitch quality value and said pitch power value.

16. The system as defined in claim 10, wherein said determining means further comprises means for determining the direction of a batted ball as a function of a position of a batter's joystick, said pitch power value and said pitch quality value, and the power of said swing.

17. The system as defined in claim 9, wherein said baseball players include a pitcher and a batter.

18. The system as defined in claim 9, wherein said baseball simulation game includes means connected to said user inputs for enabling a user to select offensive base-running strategies before a baseball is pitched.

19. A simulation system for baseball, comprising:
a processor having a memory;
a video display connected to said processor;
means for simulating and displaying on said video display a representation of a baseball playing field and a pitcher and a batter;
a plurality of user input devices for operation of said baseball simulation game wherein said pitcher simulates throwing of successive baseball pitches, said input devices defining a plurality of input parameters; and
means connected to said user input devices for adjusting the trajectory of said successive baseball pitches as a function of a plurality of said input parameters, wherein said input parameters include pitch type and pitch quality and wherein said pitch quality is adjustable before each of said successive pitches.

20. The system as defined in claim 19, further comprising means for determining the direction of a batted ball as a function of timing between the batters swing and a corresponding one of said successive pitches and at least one other of said user input parameters.

21. The system as defined in claim 20, wherein one of said user input devices is a joystick control and the direction of said batted ball is determined as a function of timing and a position of said joystick control.

22. The system as defined in claim 19, wherein said trajectory adjusting means includes means for providing user selections to the video display, said user selections comprising relative pitch quality and pitch power.

23. The system as defined in claim 19, wherein said pitch trajectory is adjusted in a vertical and horizontal direction through user control of said input parameters.

24. The system as defined in claim 19, further comprising means connected to said user input devices for selecting offensive base-running strategies before a baseball is pitched.

25. The system as defined in claim 19, wherein said user input devices include a button control panel.

26. In a computerized system, a ball game simulation, comprising:
- a computer;
- a video display connected to the computer;
- means for simulating and displaying on said video display a representation of a playing field;
- a plurality of user input devices for providing selection of input parameters wherein said input parameters affect a path of a pitched ball depicted on said video display; and
- active visual feedback means for allowing a user of said game to adjust said path of said pitched ball as a function of a plurality of said input parameters, said active visual feedback means responsive to selections made by said user in advance of successive pitched balls during operation of said ball game simulation.

27. The system as defined in claim 26, wherein said visual feedback means includes means for displaying a gauge indicating pitch type, relative pitch quality and pitch power.

28. The system as defined in claim 26, wherein said input parameters include pitch style, pitch type, pitch power and pitch direction.

29. The system as defined in claim 28, wherein said user input device for determining said pitch direction parameter comprises a joystick.

30. The system as defined in claim 26, further comprising means for determining the direction of a batted ball as a function of timing of the batters swing relative to the proximity of the pitched ball.

31. The system as defined in claim 30, wherein one of said user input device is a batter's joystick and the direction of said batted ball is also a function of the batter's joystick position, a pitch quality input parameter and a pitch power input parameter.

32. The system as defined in claim 26, wherein said path of said pitched ball is adjustable in three dimensions.

33. The system as defined in claim 26, wherein said user input devices comprise a pitching 3-button module and a batting 3-button module.

34. The system as defined in claim 26, further comprising means connected to said user input devices for enabling a user to select offensive base-running strategies before a baseball is pitched.

35. A baseball simulation game system, comprising:
- a processor and a memory;
- a video display connected to said processor;
- means for simulating and displaying on said video display a representation of a baseball playing field and baseball players, said baseball players comprising offensive base runners;
- a plurality of user input devices for operation of said baseball simulation game; and
- means connected to a plurality of said user input devices for enabling a user to determine, prior to the pitching of the baseball, offensive strategy for said base runners to be implemented following the pitching of said baseball.

36. The system as defined in claim 35, wherein said offensive strategy includes selections for hit and run, steal, and squeeze play.

37. The system as defined in claim 35, further comprising means for determining the path of said pitched baseball as a function of data obtained from said user inputs and for determining the direction of a batted ball as a function of swing timing relative to ball position.

38. The system as defined in claim 37, wherein said direction of said batted ball is also determined as a function of said data whereby said data includes values for pitch quality and pitch power.

39. The system as defined in claim 37, wherein said determining means also determines when said pitched baseball will be hit as a function of timing of a batters swing and as a function of a plurality of variable input parameters.

40. In a computerized system, a baseball game, comprising:
- a computer;
- a video display connected to said computer;
- means for simulating and displaying on said video display a representation of a baseball playing field wherein said field includes a plurality of baseball players;
- a plurality of user input devices for inputting a plurality of input parameters and for operation of said baseball game, wherein said operation includes control of pitching and batting; and
- hit/miss calculation means for determining whether a pitched baseball and a swung bat will result in a hit baseball wherein said hit/miss calculation is dependent upon swing timing and the vertical position of said bat.

41. The system as defined in claim 40, wherein one of said user input devices is a batter's joystick control and the direction of said batted ball is determined as a function of timing and said batter's joystick position.

42. The system as defined in claim 40, wherein said baseball players include a pitcher, a batter, base runner, and fielders.

43. The system as defined in claim 40, further comprising means for creating visual feedback to a user for determining the path of said pitched baseball as a function of said input parameters where said parameters include pitch quality and pitch power.

44. The system of claim 43, wherein said visual feedback means provides information representing changes in one of said input parameters, and wherein user selection of a desired one of said input parameters is based on skill of said user in making said selection in response to said represented changes.

45. The system as defined in claim 43, wherein said visual feedback means comprises a circular gauge indicating pitch styles, relative pitch quality and a circular gauge indicating pitch power.

46. The system as defined in claim 40, wherein said baseball game further comprises computation means for determining the path of said pitched baseball as a function of a plurality of said input parameters wherein said path is affected a in a 3-dimensional manner based on said input parameters.

47. The system as defined in claim 40, wherein said baseball game includes means connected to said user input devices for enabling a user to select offensive base-running strategies before a baseball is pitched.

48. A game system, comprising:
- a processor;

a video display connected to said processor;

means for simulating and displaying on said video display a representation of a playing field wherein said field includes a plurality of player objects;

a plurality of user input devices connected to said processor for inputting a plurality of game parameters;

means for determining the path of a projectile launched by one of said player objects as a function of said plurality of game parameters; and means for generating visual feedback to a user representative of one of said game parameters, wherein said visual feedback represents changes in a characteristic of said game parameter occurring with time such that skill of said user is required to input said game parameter having a desired characteristic by reference to the represented changes in said characteristic.

49. A game system as defined in claim 48, wherein said visual feedback means comprises a gauge representative of a characteristic of an input parameter.

50. A game system as defined in claim 49, wherein the gauge is representative of pitch quality.

51. A game system as defined in claim 49, wherein the gauge is representative of pitch power.

* * * * *